Figure 1:
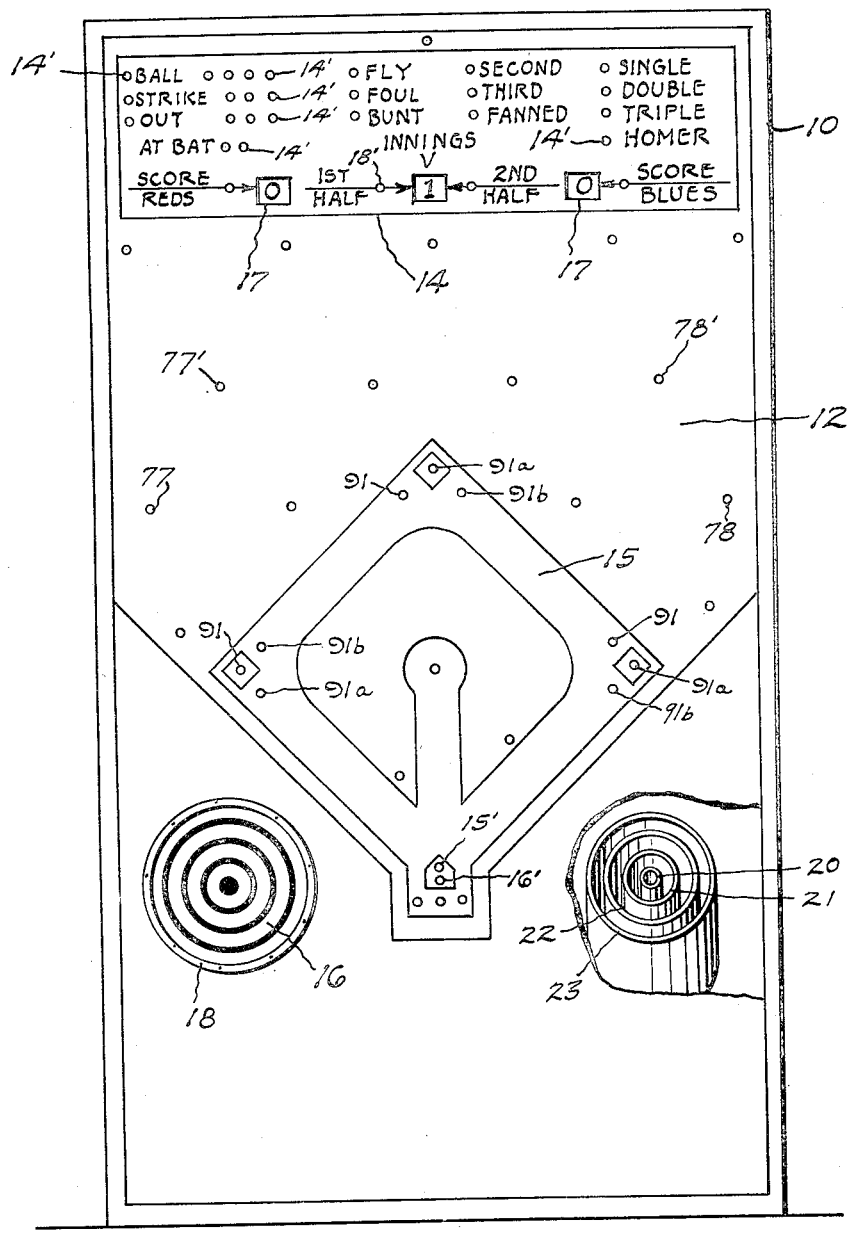

May 16, 1933.     O. O. LAMB     1,909,772

ELECTRICAL BASEBALL GAME

Filed July 8, 1932     10 Sheets-Sheet 1

Inventor

Ollo O. Lamb

May 16, 1933.  O. O. LAMB  1,909,772
ELECTRICAL BASEBALL GAME
Filed July 8, 1932   10 Sheets-Sheet 2

Inventor
Otto O. Lamb

Jack A. Ashley
Attorney

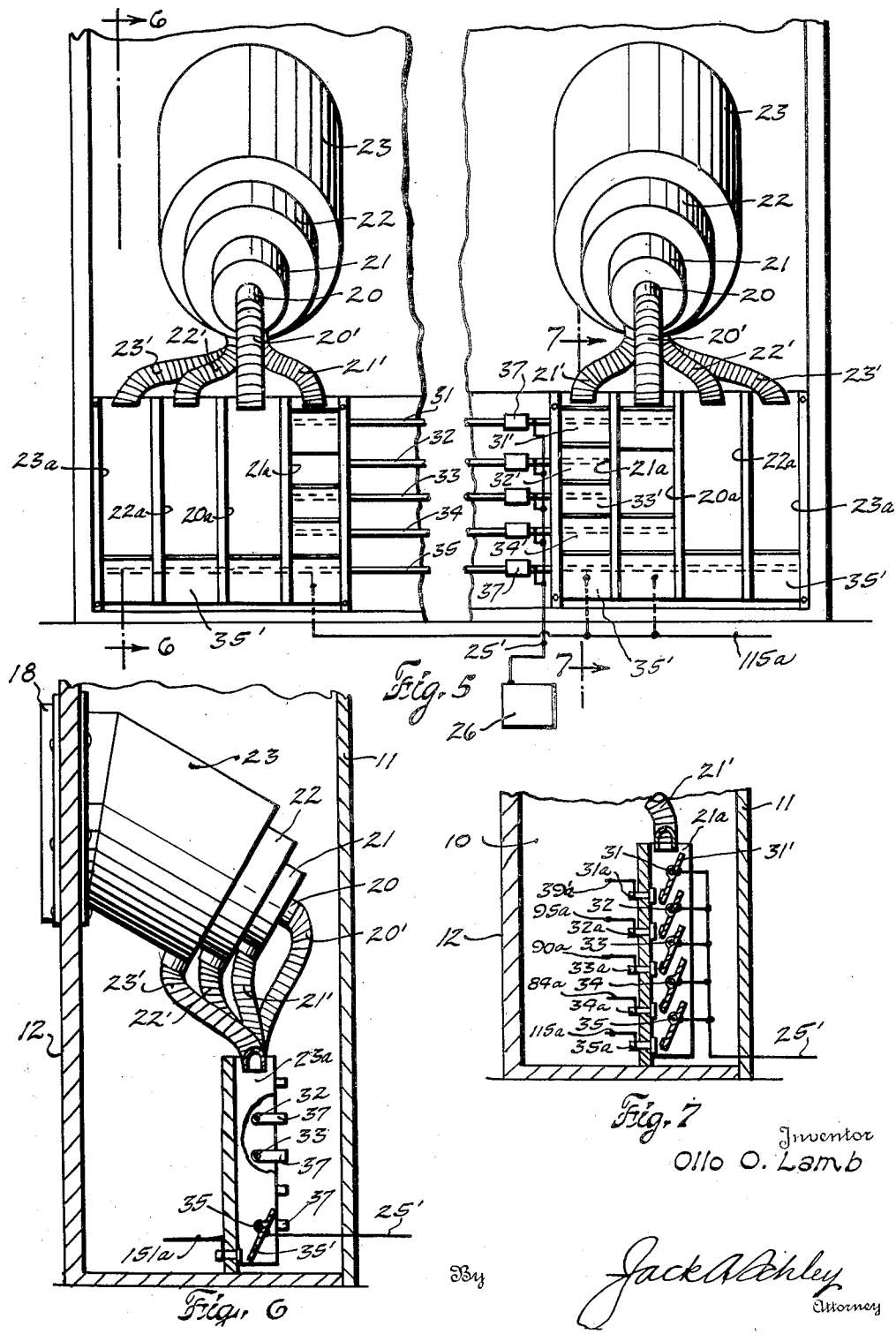

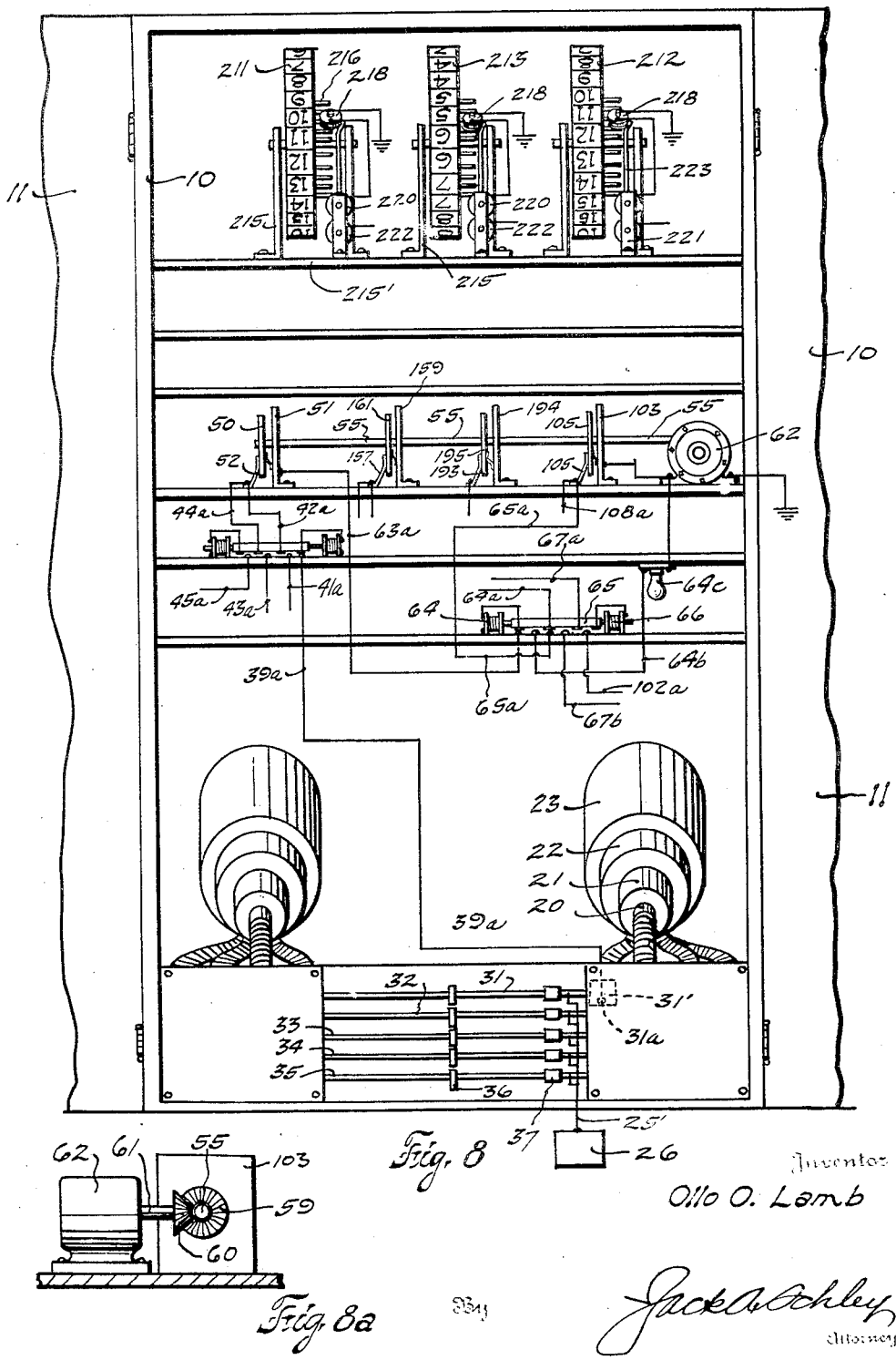

May 16, 1933.    O. O. LAMB    1,909,772
ELECTRICAL BASEBALL GAME
Filed July 8, 1932    10 Sheets-Sheet 5

Inventor
Otto O. Lamb
By Jack A. Ochley
Attorney

May 16, 1933. O. O. LAMB 1,909,772
ELECTRICAL BASEBALL GAME
Filed July 8, 1932 10 Sheets-Sheet 6

Inventor
Otto O. Lamb
By Jack A. Ochley
Attorney

May 16, 1933.　　　　O. O. LAMB　　　　1,909,772
ELECTRICAL BASEBALL GAME
Filed July 8, 1932　　　10 Sheets-Sheet 7
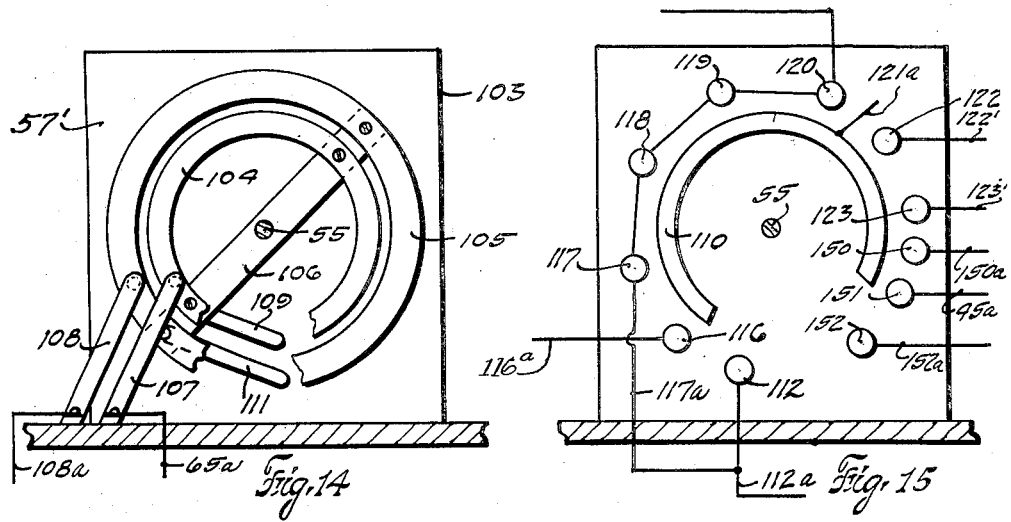
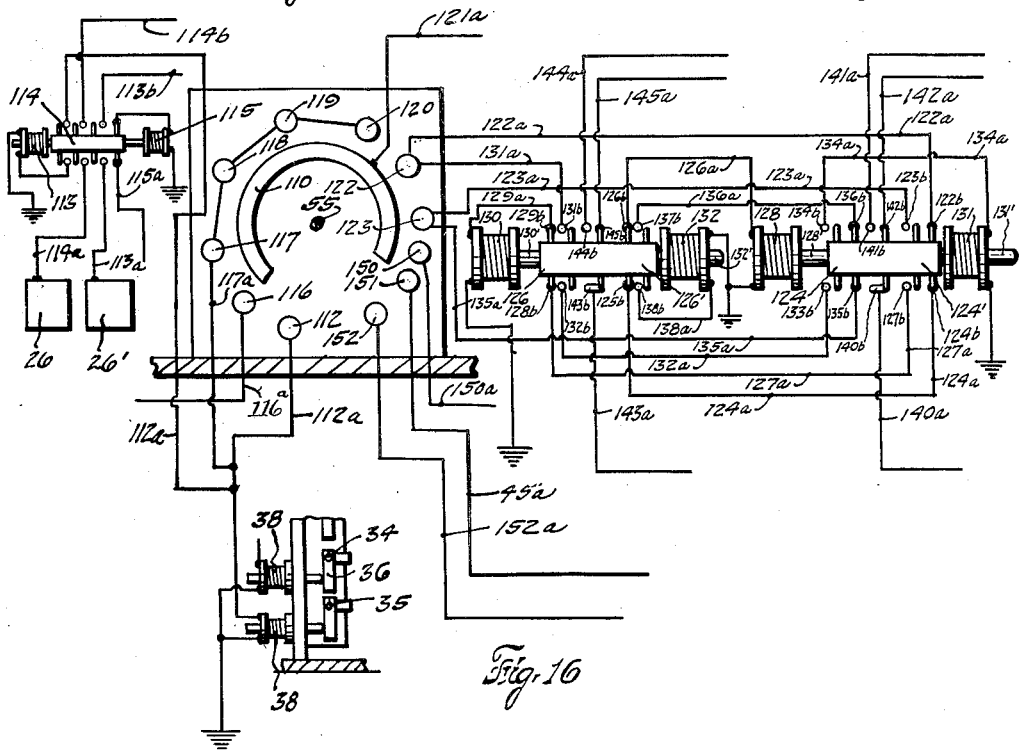
Inventor
Ollo O. Lamb
By Jack A. Ochley
Attorney

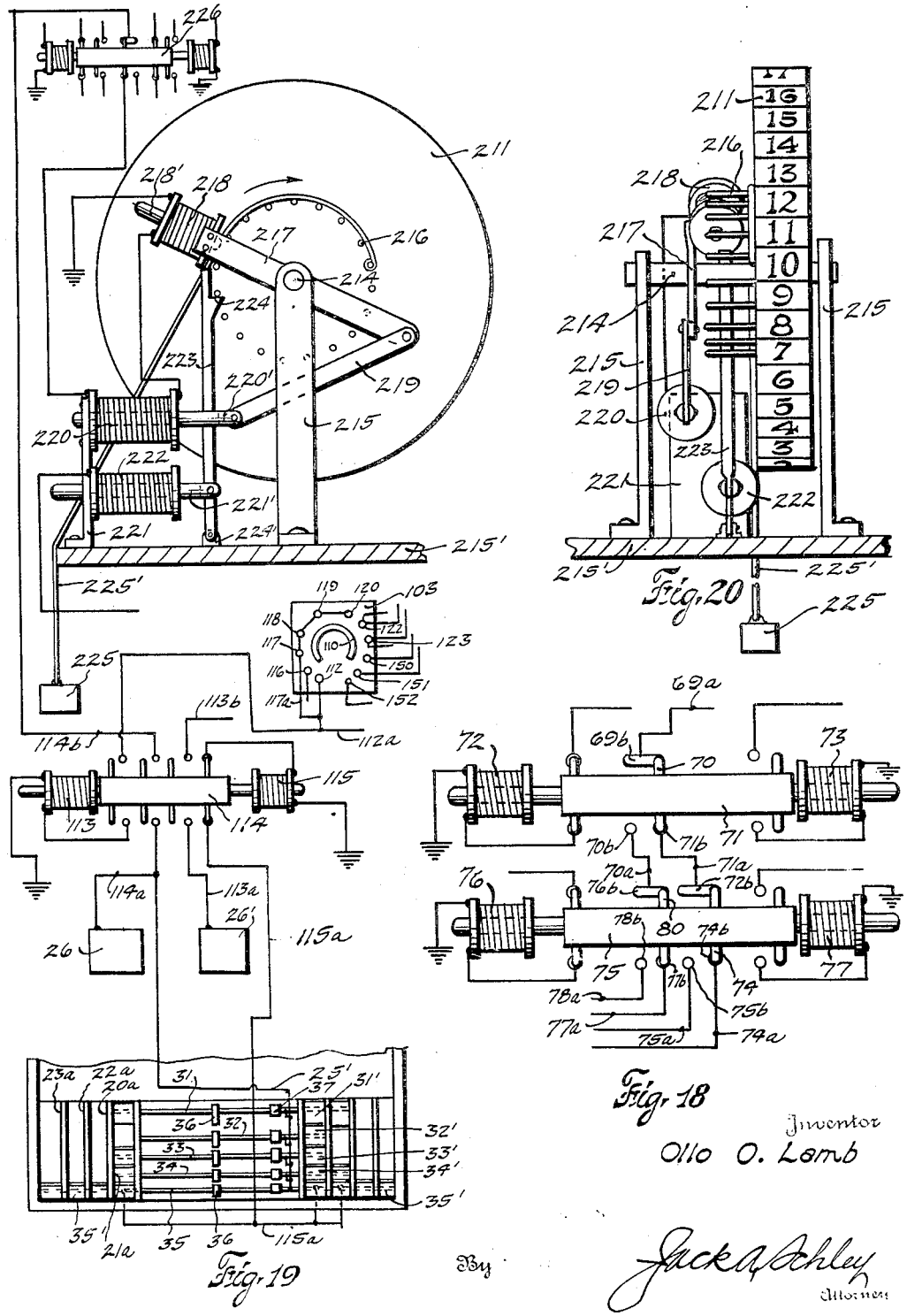

May 16, 1933.   O. O. LAMB   1,909,772
ELECTRICAL BASEBALL GAME
Filed July 8, 1932   10 Sheets-Sheet 9
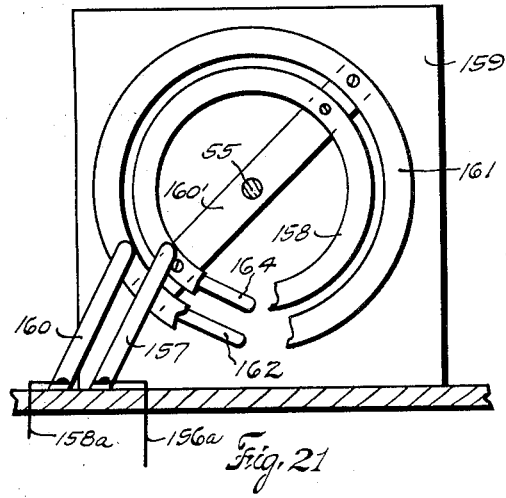
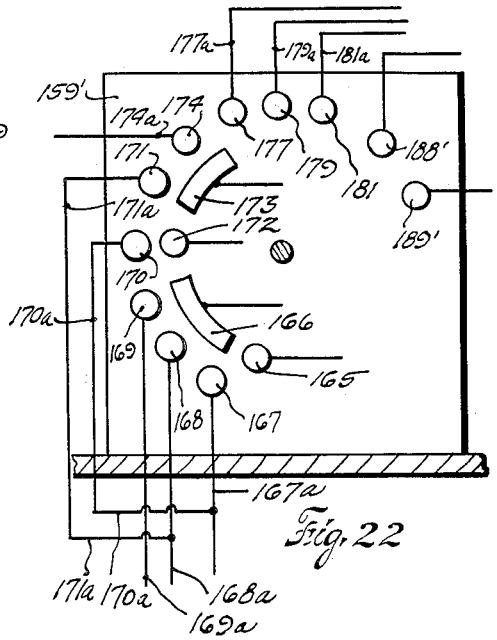
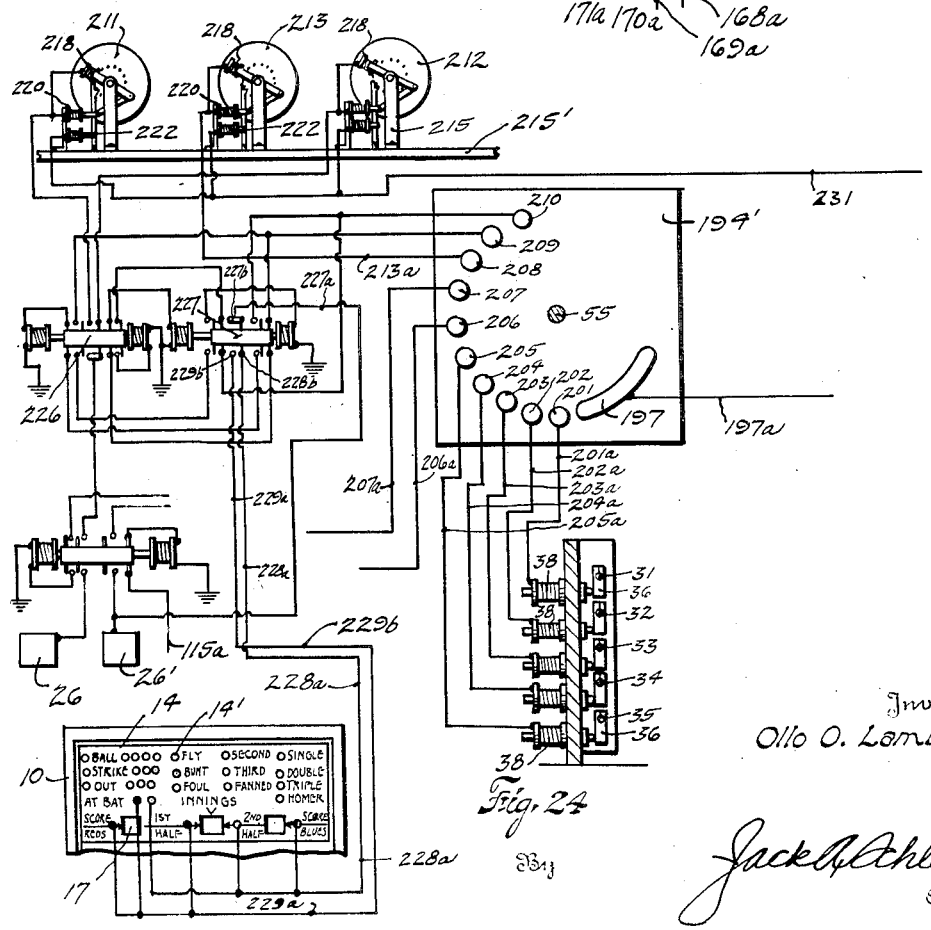
Inventor
Ollo O. Lamb May 16, 1933.   O. O. LAMB   1,909,772
ELECTRICAL BASEBALL GAME
Filed July 8, 1932   10 Sheets-Sheet 10

Inventor
Otto O. Lamb

Jack A. Ohley
Attorney

Patented May 16, 1933

1,909,772

UNITED STATES PATENT OFFICE

OLLO O. LAMB, OF DALLAS, TEXAS

ELECTRICAL BASEBALL GAME

Application filed July 8, 1932. Serial No. 621,402.

This invention relates to new and useful improvements in electrical baseball games.

One object of the invention is to provide an improved electrical baseball game arranged to be operated by a projectile fired at a target from a rifle.

Another object of the invention is to provide an electrical baseball game having means for receiving a metal shot and positioning said shot to complete an electrical circuit, whereby the game is operated, when said shot is fired at a target on the game.

Still another object of the invention is to provide an improved electrical baseball game having a target and a plurality of chutes positioned behind the target, adapted to receive a shot fired from a rifle at said target, said chutes being so constructed that each chute will control one or more separate plays on the playing board.

A further object of the invention is to provide an electrical baseball game having means for automatically registering the individual score of each player, and also means for automatically registering the innings as the game progresses.

Another object of the invention is to provide an improved electrical baseball game provided with a target and electrical circuit closing means, whereby a projectile fired from a rifle passes through the target and is conducted to the circuit closing means, together with electrical elements operated by the circuit closed by said projectile for simulating the various plays of the game and keeping the score.

Still another object of the invention is to provide an improved electrical game having a plurality of electric lamps on its playing board which are visible to the player, and to provide means for lighting a fixed number of these lamps to indicate a certain play when a rifle shot fired at a target on the playing board operates the game to designate that play.

Another object of the invention is to provide an electrical baseball game having a target and a plurality of chutes, concentric to each other, positioned behind the target, adapted to receive a shot fired from a rifle at the target, said chutes being so arranged that the inner chutes will control the better plays, such as hits, and the outer chutes will control the "out" plays, whereby the play indicated on the board depends entirely upon the accuracy of the marksman.

Still another object of the invention is to provide an electrical baseball game having automatically operated means for clearing the board and extinguishing the lamps indicating one team at bat and lighting the lamps indicating the opposite side "at bat" at the end of three outs. Also means are provided for registering the next inning at the end of each six outs.

Another object of the invention is to provide an electrical baseball game having manually operated means for clearing the board at any desired time, that is, before three outs of one inning are made, or before an entire game of nine innings has been played.

A construction designed to carry out the invention will be hereinafter described together with other features of the invention.

Figure 2:
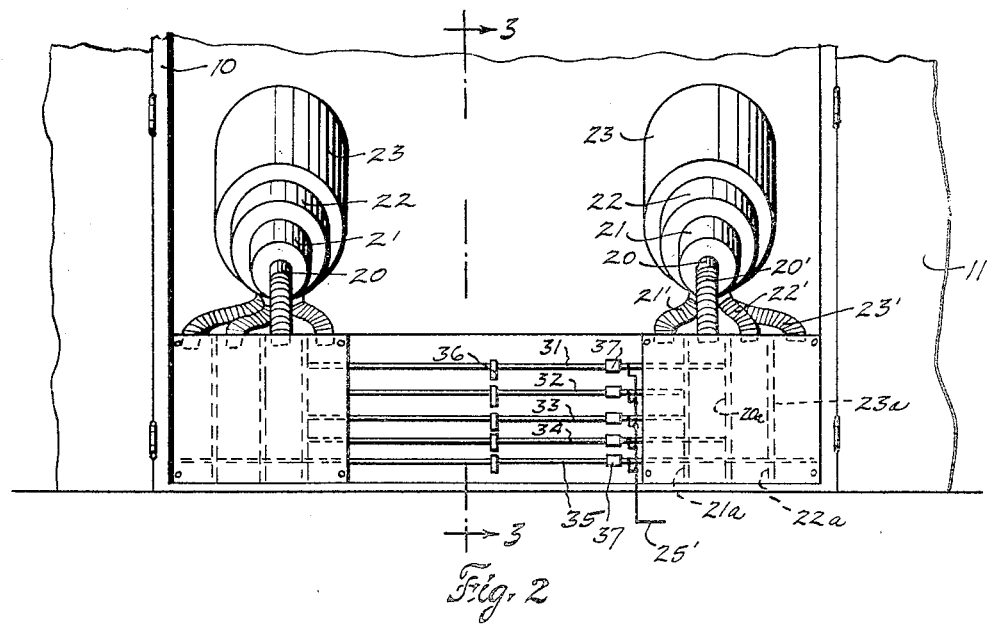
Figures 3, 4:
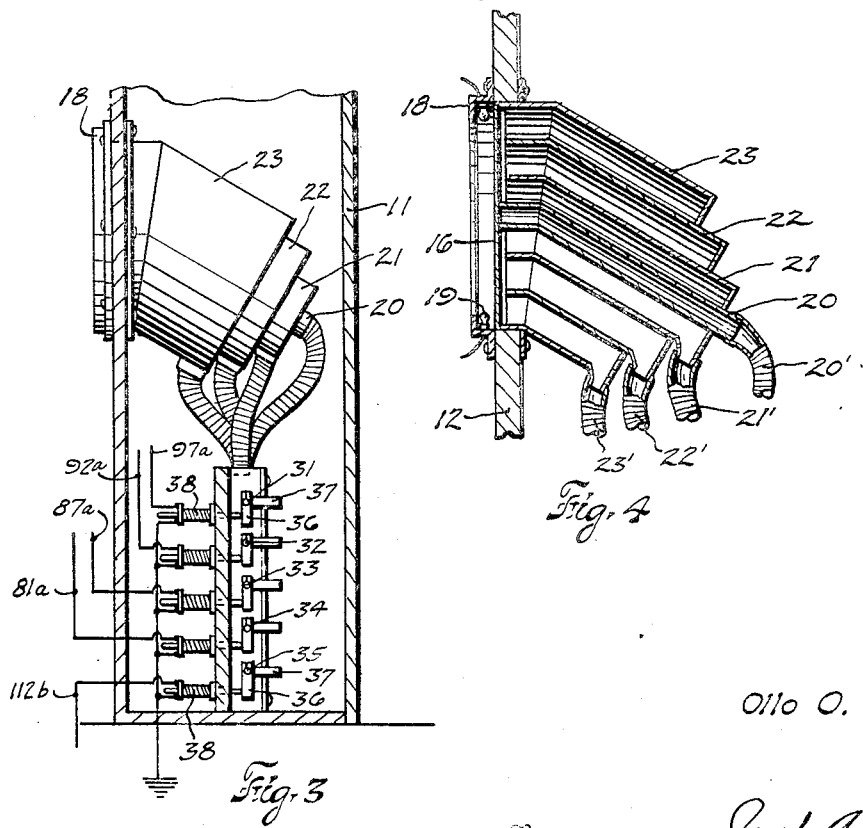
Figure 17:
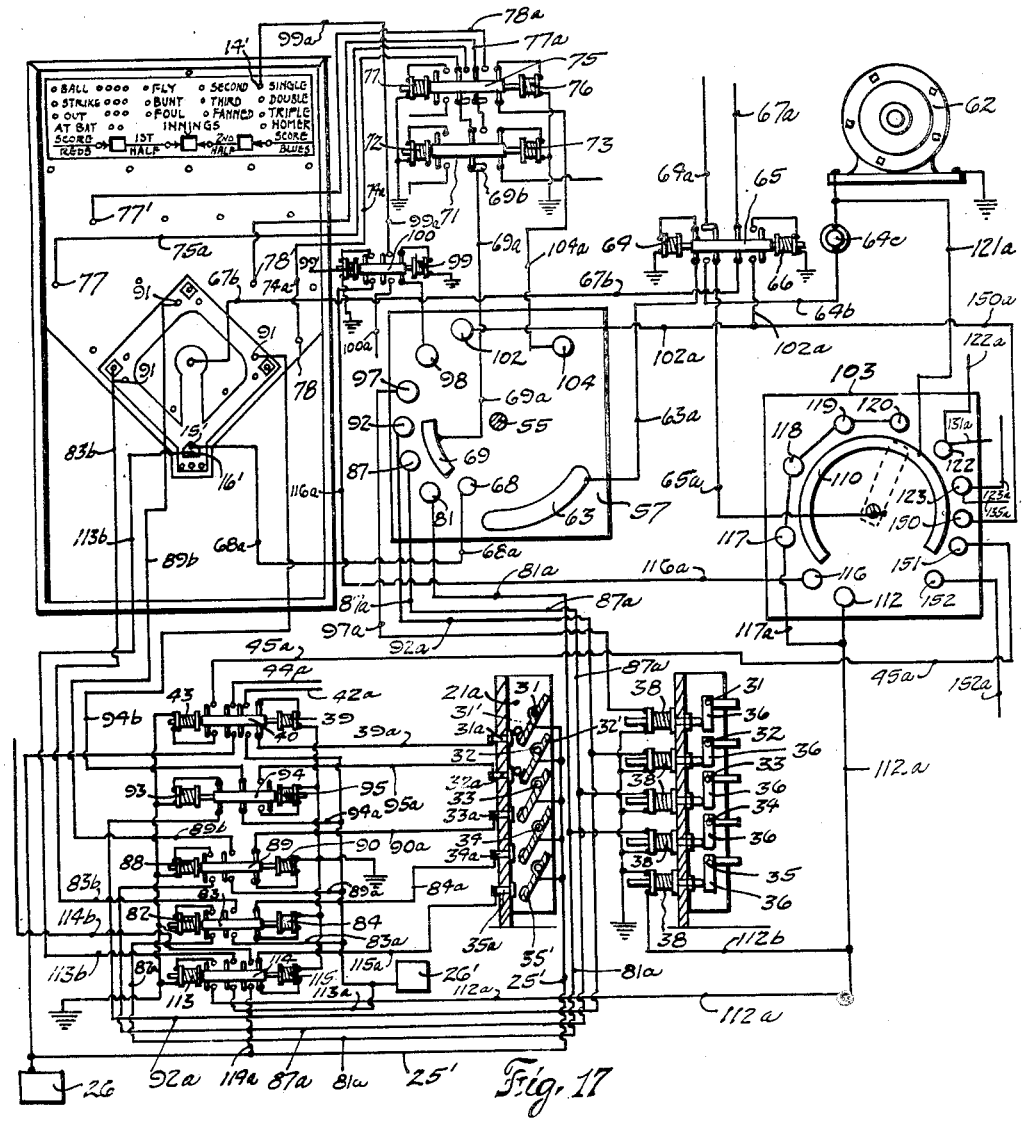
Figure 9:
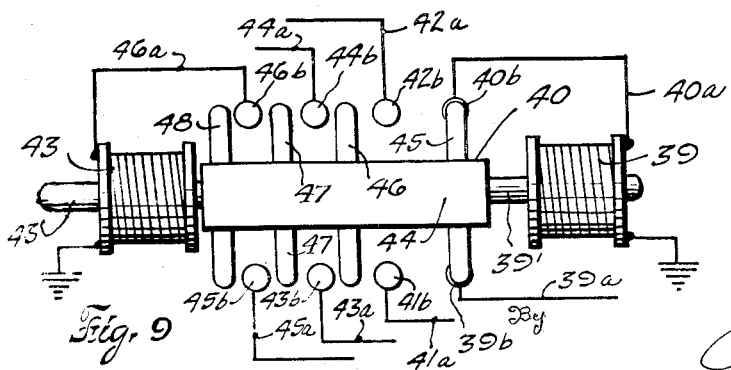
Figure 10:
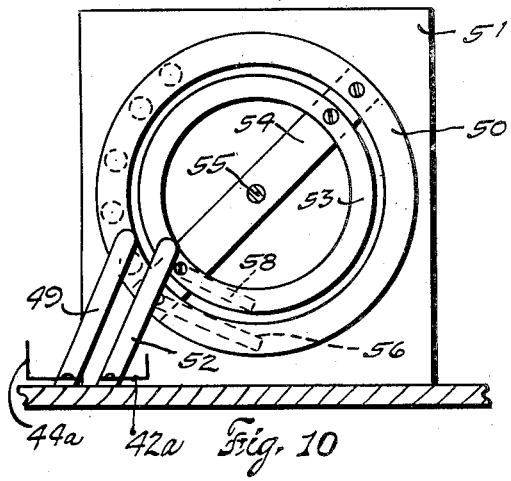
Figure 11:
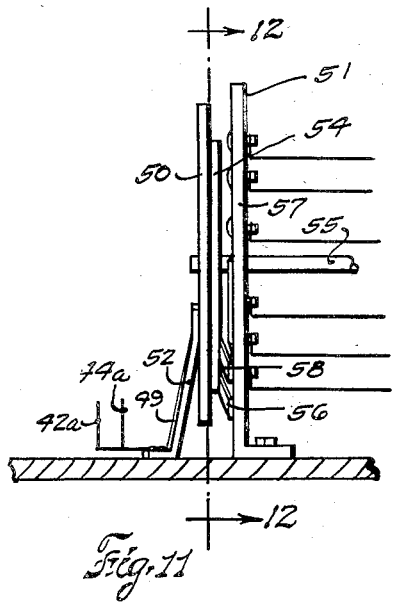
Figure 12:
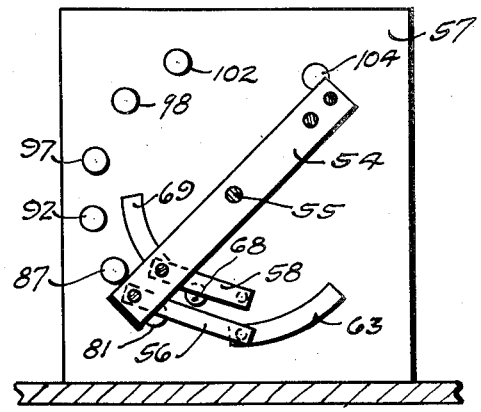
Figure 13:
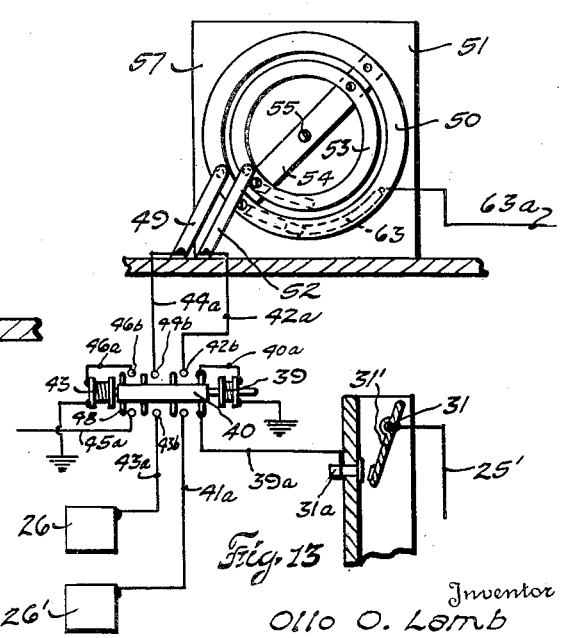
Figure 23:
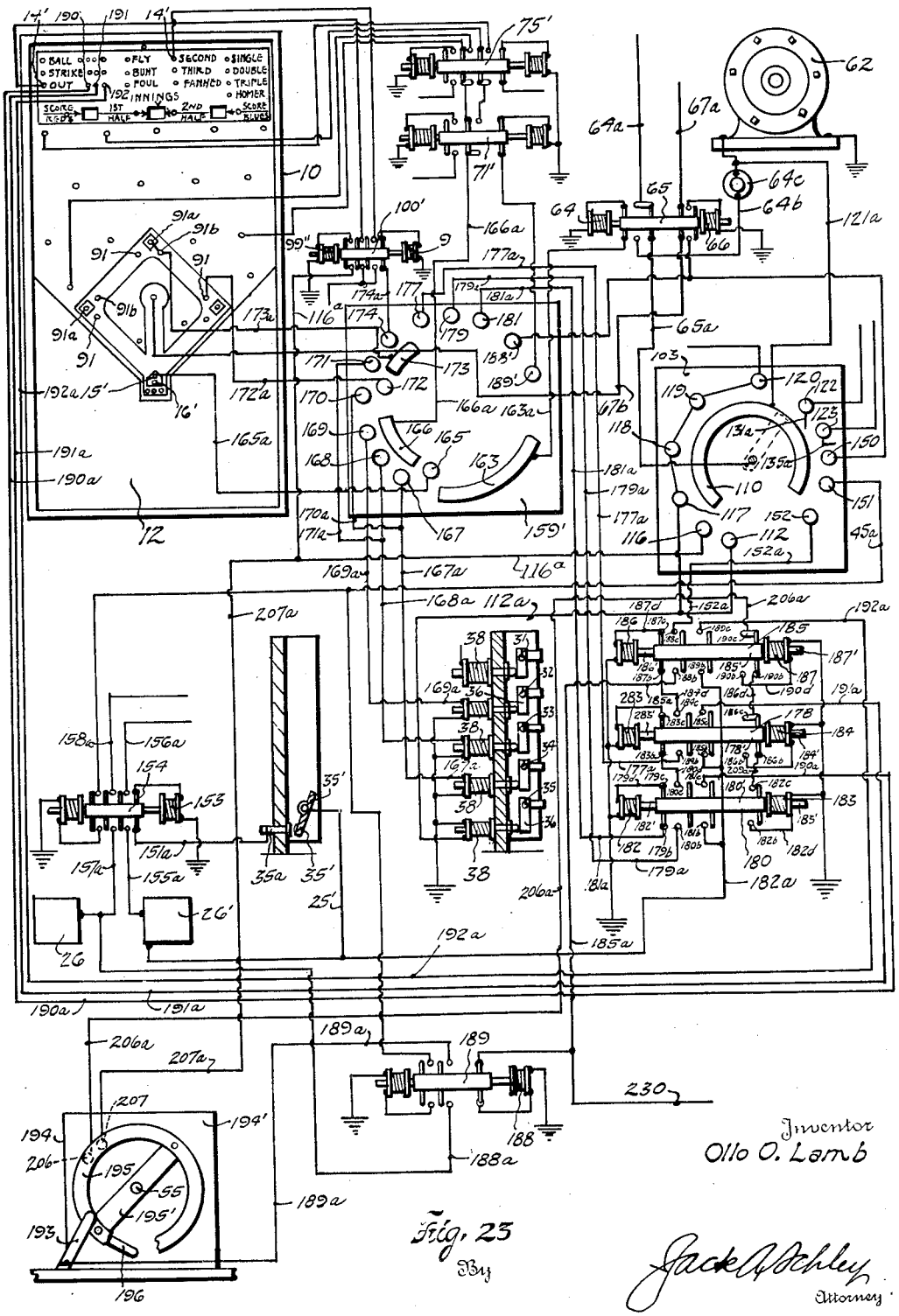

The invention will be more readily understood from a reading of the following specification and by reference to the accompanying drawings in which an example of the invention is shown, and wherein:

Figure 1 is a front elevation of an electrical baseball game constructed in accordance with the invention, Figure 2 is a partial rear elevation of the game with the rear doors swung open, Figure 3 is a vertical sectional view taken on the line 3—3 of Figure 2, Figure 4 is a sectional view of the chutes positioned behind the target, Figure 5 is an enlarged view similar to Figure 3, Figure 6 is a vertical sectional view taken on the line 6—6 of Figure 5, Figure 7 is a vertical sectional view taken on the line 7—7 of Figure 6, Figure 8 is a rear elevation of the game, Figure 8A is a detail of the distributor shaft gearing, Figure 9 is a detail of one of the double-acting switches, Figure 10 is a side elevation of the "single" distributor, Figure 11 is an end elevation of the same, Figure 12 is a vertical sectional view taken on the line 12—12 of Figure 11, Figure 13 is a wiring diagram showing the hookup between the "single" distributor and the pivoted switch valve, Figure 14 is a side elevation of the master distributor, Figure 15 is a side elevation of the master distributor panel, Figure 16 is a wiring diagram showing the double play switches in detail, Figure 17 is a wiring diagram of the "single" play hook-up, Figure 18 is an enlarged detail of the outfield lamps controlling switches, Figure 19 is an enlarged side elevation of one of the score drums and including its control wiring, Figure 20 is an end elevation of the inning register, Figure 21 is a side elevation of the distributor controlling the "out" play, Figure 22 is a side elevation of the panel of the distributor controlling the "out" play, Figure 23 is a wiring diagram of the "out" play hook-up, and Figure 24 is a wiring diagram of the clearing distributor hookup.

In the drawings the numeral 10 designates a rectangular upright boxlike casing, having doors 11 forming its rear wall to provide for easy access therein (Figures 2, 3 and 8). The entire front wall of the casing forms the playing board 12.

A panel or scoreboard 14 is provided at the top of the playing board and extends across the same. This panel contains the necessary data for indicating and registering the play, score, innings, etc. Below the panel and extending to a point below the center of the board, a miniature baseball diamond 15 is suitably painted or shown thereon. The lower edge of the panel 14 with the sides of the board represent the fences or limits of the outfield of the diamond.

Targets 16 (Figure 1) are positioned on either side of the board directly below the diamond. Although two targets are shown, the invention is not to be limited to any certain number, as it would be possible to play the game with any desired number. The target is made of heavy paper or cardboard so as to allow an air rifle shot, or BB, to pass therethrough. The target 16, (Figures 3 and 4) is surrounded by a flanged frame 18 in which lights 19 are mounted so as to indirectly illuminate the target for night play. The targets 16 are merely set in the front wall and are easily replaceable when said targets become worn due to shots passing therethrough.

The panel 14, as shown in Figure 1, has printed thereon the names of the plays which can be made. Adjacent each play designation a small lamp 14' is provided and the lamp opposite the play made is lighted to identify said play. Four lamps 14' are provided after the word "ball", each to show a called ball. Also, three lamps 14' are positioned after each of the words "strike" and "out", for designating a called strike and to register the number of outs. Two lamps 14' are provided after the words "at bat" and these lamps are preferably colored to distinguish which side is at bat. One or the other of these lamps is constantly lighted while the board is being used. Windows 17 in the lower end of the panel allow the score drums and the inning drum to be visible therethrough, as will be hereinafter explained.

A lamp in the pitcher's box is lighted at all times except when a play is being made. Home plate is provided with two lamps 15' and 16' for respectively designating a pitched ball and a run scored. A trio of lamps 91, 91a, and 91b, are positioned at each base, 91 for indicating a runner thereon, and 91a and 91b for indicating an out made at that base. A plurality of other lamps 77, 77', 78 and 78' are scattered over the out-field for indicating the flight of the ball.

Before the game is started, all lamps are extinguished except one of the lamps 14' opposite the designation "at bat", a lamp 18' designating the first half of the first inning and the pitcher's box light. This latter is to tell the player that the ball is ready to be pitched and the board is clear. The shot is fired at the target 16, and the play made depends entirely upon the accuracy of the player's shooting. In other words, the nearer to the center of the target that the shot hits, the better the play will be. For example, we will say the player has made a single. His shot, as will be hereinafter explained, has not hit the center of the target but has hit fairly close.

Directly after the shot has been fired, the lamp in the pitcher's box is extinguished and the lamp 15' at home base is flashed to represent the flight of a pitched ball. Then one of the outfield lamps, designating where the ball has been hit, is lighted. As this lamp is extinguished, the lamp 91 at first base is lit and held to show that the player has singled and is now on base. Directly thereafter the lamp 14' on the score panel 14 adjacent "single" is lighted and the pitcher's box lamp is again lighted to designate that the board is again clear and ready for the next play. It is pointed out that the lamp 91 at first showing a man on that base and the lamp 14' are held lighted until the next play is made.

Directly behind each target, I provide a plurality of chutes 20, 21, 22 and 23 respectively, arranged concentrically and made in the form of elbows. Their forward ends are mounted in the playing board, in the same plane thereof, and their rear ends are disposed at an angle, as clearly shown in Figure 4, in stepped relation, so that one protrudes beyond the other.

Since both targets are substantially alike, a description of one will suffice for both. The smallest, or center chute 20 is positioned directly behind the bull's eye of the target. It is noted that the chute 20 extends up to the removable target but the forward edges of the other chutes stop short of the target (Figure 4). Thus should a shot hit one of these forward edges, it would rebound against the inner face of the target and be thrown into one of the chutes instead of rebounding back outside of the playing board. When a shot enters this chute it travels downwardly through a flexible tube or conductor 20', secured to the rear end of the chute, and into a channel 20a extending upwardly from the bottom of the casing 10. In the drawings I have shown flexible tubes 21', 22' and 23' leading from the chutes to channels 21a, 22a and 23a respectively. Each of the channels controls one play, and for the sake of clarity, we will suppose the player has scored a single. This means that the shot has entered the chute 21 and has passed downwardly through the tube 21' into the channel 21a.

I have shown (Figure 5) eight channels, although the invention is not to be limited to this number. Since each channel operates the lamps used in one play, it is readily seen that an indefinite number of plays could be worked out. Mounted in the side walls of the channels are five horizontal rock shafts 31, 32, 33, 34, and 35. Each shaft carries a tripping lug 36 intermediate its ends (Figures 3 and 5), and this lug is held in constant engagement, by means of a weight 37 secured to the shaft, with the core of a solenoid 38, whereby the operation of said solenoid will rock the shaft. The shaft 31 extends through the side of the channel 21a and supports a pivoted valve 31' which when the solenoid is in its normal position (Figure 7) is held outwardly and away from a headed contact 31a, which latter extends through the front wall of the channel 21a. The shafts 32, 33, 34 and 35 carry similar switch valves 32', 33', 34' and 35', which are also held out of engagement with their corresponding contacts 32a, 33a, 34a and 35a, when their solenoids are in their normal positions. These valves are disposed in the various channels according to the plays controlled thereby.

Following a single play through, the shot drops from the tube 21' into the channel 21a as hereinbefore explained. The pivoted valve 31' has its lower edge close enough to its contact 31a to prevent the shot from falling therebetween. The lower end of each valve and the head of each contact are lined with carbon to prevent the shots adhering thereto, because of the electrical currents passing therethrough. The rock shafts are connected through a lead-in wire 25' with a transformer 26. Thus when the metal shot drops between the valve 31' and its contact, it completes the electrical circuit through a wire 39a to operate a solenoid 39, which reverses a double-acting switch 40 shown in Figure 13. This action completes the electrical circuit from the transformer 26 to a commutator ring 50 of a distributor 51, and at the same time it also completes the electrical circuit from another transformer 26' of lower voltage, to a second ring 53 of the same distributor, as will be hereinafter explained.

The details of the switch 40 are clearly shown in Figure 9. The switch includes two solenoids 39 and 43 which are provided with the usual sliding cores 39' and 43' and a plunger 44, secured at its ends to the cores, whereby it is slidably mounted between said solenoids. The wire 39a leading from the contact 31a is connected with a contact point 39b which is positioned in the path of a spring brush 45, carried by the plunger 44 of said switch at one end thereof. Directly opposite the contact point 39b is another contact 40b which is also in the path of the opposite end of the brush 45 so that when said brush rides onto the contact 39b it will also engage the contact 40b to connect said contacts. A lead wire 40a connects the contact 40b with the solenoid 39. Thus when the switch 40 is in its open position (as shown in Figures 9 and 16) the solenoid 39 will be operated as soon as the shot drops onto the pivoted valve 31' and closes the circuit from the transformer 26.

The lower voltage transformer 26' (Figure 17) has a wire 41a leading therefrom and connected to a contact 41b positioned in alinement with a second spring brush 46, also carried by the plunger 44 of the switch 40. Another contact 42b is positioned directly opposite the contact 41b and is adapted to be engaged by the spring brush 46 at the same time that the brush engages the first contact. A wire 42a connects the contact 42b with a brush 52 which engages the ring 53. The transformer 26 is provided with a lead 43a which terminates at a contact point 43b in the path of a third spring brush 47 on the plunger 44. A contact 44b directly opposite the contact 43b is connected to the commutator ring 50 through a wire 44a by a brush 49. With this arrangement, it is obvious that when the switch 40 is thrown to its closed position through the operation of the solenoid 39, the electrical circuits from the transformers to the rings are closed. When the plunger 44 is shifted by the solenoid 39, the spring brush 45 rides off the contacts 39b and 40b and thus breaks the circuit from the transformer 26 to said solenoid 39. This prevents the electric current from burning out the coils of the solenoid as no current is necessary after the switch is shifted. Also the current is taken off the metal shot, thereby preventing the same from melting said shot or causing it to stick to the valves.

This same shifting action of the plunger 44 to the closed position causes another brush 48, similar to the brushes 46 and 47 and also mounted on the plunger, to engage two contact points 45b and 46b. The contact 46b is directly connected to the solenoid 43 by a wire 46a. A wire 45a leads from the contact point 45b to a master distributor 103 (Figure 17), as will be hereinafter explained. It is noted that when the brush 45 is in engagement with its contacts 39b and 40b, the brush 48 is not contacting the points 45b and 46b and vice versa. By arranging the switch in this manner the solenoids must be alternately operated.

When the switch 40 has been thrown to its closed position, as has just been explained, the spring brush 47 completes the circuit from the wire 43a to the wire 44a, which is connected to the brush 49 (Figure 13). The brush 49 rides on the commutator ring 50 of the distributor 51. The shifting of the plunger 44 also completes the electrical circuit between the wires 41a and 42a. The wire 42a has a connection with the brush 52, similar to the brush 49, which rides on the inner ring 53 of the distributor 51. As shown in Figures 10, 11 and 13, the rings 50 and 53 are secured to a rotatable cross bar 54, which is fastened on a horizontal shaft 55, which extends across the casing 10. The bar 54 is made of wood or other electrical nonconducting material. It is noted that the rings 50 and 53 are entirely separate from each other, and no electrical connection is had therebetween.

A spring brush 56 (Figure 12) is secured to the rear of the bar 54 and has electrical connection with the ring 50 and is positioned to engage contacts 63, 81, 87, 92, 97, 98, 102 and 104 respectively, of the distributor. A second spring brush 58 having electrical connection with the inner ring 53 and carried by the bar 54, is adapted to engage an inner row of contacts 68 and 69 also on the panel 57, as said ring is revolved. The distributor 51 controls the lamps 14', 15', 78' and 91, which are used to designate a one-base hit. It is pointed out that each play is provided with its individual distributor, which controls that play. Since all the distributors are substantially alike except for their number of contact points, it is not believed necessary to describe each separately. The distributors are mounted as shown in Figure 8, and the shaft 55 is journaled in the panels of said distributors and carries the crossbar of each distributor, whereby the one shaft will rotate the rings of all the distributors. The shaft carries a miter gear 59 (Figure 8A) at one end, which is engaged and driven by a bevel gear 60 mounted on the shaft 61 of an electric motor 62.

When the shot drops onto the pivoted valve 31' (Figures 7, 13 and 17) to complete the electrical circuit and shift the switch 40 to its closed position, thereby feeding the electrical current from the transformers 26 and 26' to the spring brushes 49 and 52, the brush 56 on the rear of the cross bar 54 is resting on the elongated contact 63 on the panel 57. The current passes from the brush 49 through the ring 50, then through the contact 63, and finally through a lead wire 63a to operate a solenoid 64 of a switch 65. The switch 65 is of the same construction as the switch 40 hereinbefore described, and has the solenoid 64 at one end and another solenoid 66 at its other end. It is not believed necessary to describe the switch in detail as it would be merely repetition.

When the solenoid 64 is operated and the switch 65 is thrown to its closed position, it closes an electrical circuit from a wire 64a through another wire 64b, then through a resistance 64c to the motor 62. By passing the current through the resistance, the motor is slowed down to allow the rings of the distributors to revolve slowly, thereby assuring that the brushes 56 and 58 will engage the contacts on the panel 57. The circuit leading from the transformer 26' through a wire 67a, then through a brush on the switch 65, and finally through another wire 67b connected to the pitcher's box lamp, is broken when the solenoid 64 is operated to shift the switch 65 to its closed position. This extinguishes the lamp in the pitcher's box at the same time that the motor is started. As the motor starts, the shaft 55 is rotated through the medium of gears 59 and 60, and the cross bar 54, carrying the rings 50 and 53, is revolved. As the rings start their revolution, the spring brush 58 engages the first contact 68, which is directly connected through a wire 68a with one of the lamps 15' at the home plate. Thus it is seen that as soon as the lamp in the pitcher's box is extinguished, the lamp at home plate 68b is lit to show that the ball has been pitched.

After passing the contact 68 on the panel the spring brush 58 engages an elongated contact 69, which has a wire 69a leading therefrom, to a long contact 69b in the path of a brush 70 of another switch 71 (Figures 17 and 18). The switch 71 has solenoids 72 and 73 at each end. The brush 70 carries the current coming through the wire 69a to one of two contacts 70b, or 71b, depending upon the position of the switch. In the position shown in Figure 18, the current passes from the contact 71b through a wire 71a to another long contact 72b. This contact is positioned in the path of a brush 74 of another switch 75, which also is provided with solenoids 76 and 77 at each end.

After passing through the spring brush 74, the current is carried to one of two contacts 74b and 75b, which have direct connection through wires 74a and 75a with outfield lights 78 and 79. The contact 70b is connected by a wire 70a to a long contact 76b. A spring brush 80 on the switch 75 rides onto this contact and according to the position of the switch 75, carries the current to either a contact 77b or a contact 78b, which are directly connected by wires 77a and 78a to outfield lights 77' and 78'.

The solenoids 72 and 73 of the switch 71 are operated by distributors other than the distributor 51 as will be hereinafter explained. The solenoid 76 and 77 also have connection with other distributors which operate the switch 75. It is obvious that by using the hookup shown in Figure 18, it is possible to light four different outfield lights when a single is made. In other words, when a single is made, it does not mean that the same lamp in the outfield will light each time.

As the rings 50 and 53 of the distributor 51 are rotated, the spring brush 56 on the rear of the bar 54 engages the first contact 81 in its path directly after the brush 58 has passed the first contact 68. The contact 81 has direct connection, through a lead wire 81a, with the solenoid 38, which is in constant engagement with the lug 36 (before referred to) of the rock shaft 34. It is obvious that as the brush 56 engages this contact 81 to send the current to the solenoid 38, the solenoid will be operated to rock the shaft 34 (Figures 3, 6, 7 and 17), which action will swing the pivoted switch valves 34' mounted on said shaft. Thus, if a shot were held on any of the valves 34', it would be dropped through to the next valve 35' and complete another electrical circuit, as will be hereinafter explained. The wire 81a also has connection with the solenoid 82 of a switch 83. The other solenoid 84 of the switch 83 is connected through a wire 84a to the contact 34a. Thus, if a shot in the previous play has been dropped onto the pivoted valve 34', the circuit would have been closed to the solenoid 84 through the wire 84a. This action would have shifted the switch 83 to close an electrical circuit between a wire 83a leading from the transformer 26', and another wire 83b, which leads directly to the lamp 91 at third base on the baseball diamond. This would show that a man is on third base, and the lamp 91 thereat will remain lit until the solenoid 82 of the switch 83 is operated to shift the said switch to its open position.

As has hereinbefore been stated, the wire 81a leading from the contact 81 on the panel 57 of the distributor 51, not only operates the solenoid 38 to rock the shaft 34, but also at the same time closes the circuit to the solenoid 82. Thus it is evident that when the shot drops onto the pivoted valve 34', it will light the lamp 91 at third base, which lamp will remain lit until the next play; that is, until the next revolution of the ring 50, at which time the solenoid 38 will be operated by the engagement of the brush 56 with the contact 81, to allow the shot to drop through to the switch 35', pivotally mounted on the lowermost rock shaft 35 at the base of the channels. At the same time, the switch 83 is thrown to its open position to extinguish the light 91, and thereby shift said switch to its closed position ready for the next operation controlled by the valve 34'.

As the ring 50 continues its rotation, the brush 56 next engages a contact 87 which is positioned opposite the elongated contact 69. This contact is wired in the same way as the contact 81, and has a lead wire 87a which leads to the solenoid 38 engaging the lug 36 of the rock shaft 33. The wire 87a then continues to a solenoid 88 of a switch 89 similar to the switch 83. The other solenoid 90 of this switch has connection through a wire 90a with the headed contact 33a. The operation of the parts when a shot drops onto the valve 33' on the rock shaft 33, is the same as that of the valve 34' and switch 83. It is not believed necessary to follow the details of this particular switch 89 except to state that when the switch is in its closed position, it closes the circuit between a wire 89a, leading from the transformer 26', and a wire 89b; the latter having direct connection with the lamp 91 at second base, which designates a man on that base.

The next contact 92 on the panel 57 to be engaged by the brush 56 on the rear of the ring 50 is similar to the contacts 81 and 87, and controls the lamp 91 at first base. A lead wire 92a leads to the solenoid 38, which operates the rock shaft 32, then continues on to carry the current to the solenoid 93 of a switch 94. As shown in Figure 17, the second or other solenoid 95 of this switch has been operated through a lead wire 95a, which has connection with the headed contact 32a. The shot is shown between the pivoted valve 32' on the rock shaft 32 and the contact 32a, thereby completing the circuit from the transformer 26 to operate said solenoid 95 and throw the switch 94 to its closed position. This closes the circuit between a wire 94a which has connection with the transformer 26' and a second wire 94b leading directly to the lamp 91 at first base. The shot was dropped in the previous play between the pivoted valve 32' and the headed contact 32a to throw the switch 94, thereby lighting the lamp 91, and designating a man on first base. As the brush 58 engages the contact 92 the circuit is closed over the wire 92a to operate the solenoid 38 to rock the shaft 32, and at the same time operating the solenoid 93 of the switch 94 to throw said switch to its open position and extinguish the lamp 91 at first base. The rocking of the shaft 32 allows the shot which has been held by the pivoted valve 32' to drop through to the next valve 33' on the rock shaft 33, thereby completing the circuit from the transformer 26 through the wire 90a to the solenoid 90 of the switch 89, which action shifts said switch to its closed position and lights the lamp 91 at second base designating the advancement of the man from first to second.

After passing the contact 92 the brush 56 of the ring 50 next engages a contact 97 which has a lead wire 97a connected to the solenoid 38 of the topmost rock shaft 31, whereby the pivoted valve 31' is swung outwardly to allow the shot to drop through to the next switch 32' on the rock shaft 32. It is noted that the wire 97a terminates at the solenoid 38 and does not continue around to operate the other solenoid 43 of the switch 40 as is the case of the switches 83, 89 and 94, which control the lamps at third, second and first bases, respectively. This switch 40 remains in its closed position until the rings have made a complete revolution, as will be hereinafter explained.

By the time the brush 56 on the bar 54 has passed the contact 97 of the distributor, the brush 58 has contacted and passed over the long contact 69 to light and extinguish one of the outfield lamps, as has been hereinbefore explained. As the rings continue their travel, the brush 56 next engages a contact 98, which operates the solenoid 99 of a switch 100, through a lead wire 98a. When the solenoid 99 is operated to shift the switch 100, an electrical circuit is closed over a wire 100a leading from the transformer 26' and another wire 99a leading from the opposite side of the switch to the lamp 14' opposite the "single" on the panel 14. Thus it will be seen that before the rings have made one half of a revolution, all the lamps on the playing board 12, designating the particular play made, have been lighted and extinguished in order. In other words, referring to the single play (Figure 17), by the time the brush 56 passes the contact 98 the lamp in the pitcher's box has been extinguished, the lamp 68b at home base has been lighted and extinguished, showing a pitched ball, the lamp 78 showing the flight of the ball in the outfield has been lighted and extinguished, the lamp 91 on first base has been lighted and held, showing a man on first, and the score panel lamp 14', designating the play, has been lighted and so remains until the next play, as will hereinafter be explained.

When the brush 58 has passed the contact 98 it is obvious that all the lamps necessary to designate the single play have been operated. The remaining contacts, hereinafter described, are provided for the purpose of restoring the switches to their open positions so that upon the next revolution of the rings 53 and 50 the play may again be registered.

The next contact 102 engaged by the brush 56 on the panel 57 has connection through a lead wire 102a with the solenoid 66 of the motor switch 65. Thus, as the current passes through this contact to said solenoid, the switch 65 is shifted to its normal position. This again closes the circuit from the transformer 26' between the wires 67a and 63a to again light the lamp in the pitcher's box, which was extinguished when the switch 65 was shifted to start the play. At the same time the circuit is broken between the wires 64a and 64b and the current is carried from the wire 64a through the switch 65, then through a wire 65a which is connected to a master distributor 103, and then to the motor 62. By changing the course of the circuit, the same passes directly to the motor instead of through the resistance 64c. This speeds up the motor and eliminates a waste of time in waiting for the board to clear. The disks 50 and 53 are revolving rapidly now and the brush 56 engages the last contact 104 on the panel 57. This contact has connection through a wire 104a with the solenoid 73 of one of the outfield switches 71. Thus, as the brush passes over the contact 104 and the current is carried therethrough, the solenoid 73 is operated to shift the switch 71, whereby a different outfield lamp will be lighted on the next play to the outfield. The other solenoids 72, 76 and 77 of the switches 71 and 75 are connected to distributors which control other plays. It is not important or essential that they be hooked up to any particular distributor so long as they are operated from time to time, so that a variation of the outfield lighting is had.

The master distributor 103 (Figures 1, 4, 15, 16 and 17) is similar to the distributor 51, and carries an inner commutator ring 104, and an outer commutator ring 105, said rings being secured to a non-conducting cross bar 106, which is also mounted on the shaft 55. Thus when a play is made and the motor is started, the rings 104 and 105 on the master distributor will revolve simultaneously with the rings of the other distributors. A spring brush 107 is positioned to constantly engage the inner ring 104, and has a wire 65a, which carries the current, attached thereto. A similar brush 108 riding on the outer ring 105 has a wire 108a connected thereto, and leading from the transformer 26. A spring brush 109 is mounted on the rear of the bar 106 and has electrical connection with the ring 104 and is adapted to engage an elongated contact 110 on the panel of the distributor 103. The brush 111 is mounted in the same way also on the rear of the bar 106 and engages a plurality of contacts on the panel, as will be hereinafter explained. This brush is electrically connected with the ring 105.

Since the rings on the master distributor are rotated simultaneously with the rings of the other distributors, it is obvious that when a "single" is made and the brushes 56 and 58 engage their respective contacts, as has already been described, the brushes 109 and 111 will at the same time be passing over the contacts on the panel 57′. The first contact 112, which is engaged by the brush 111 as the ring 105 is rotated, has connection through a wire 112a with the solenoid 113 of a switch 114. The wire 112a has a tie-in wire 112b connected thereto and to the solenoid 38, the core of which is in constant engagement with the tripping lug 36 of the lowermost rock shaft 35. With this arrangement, each time the solenoid 113 of the switch 114 is operated, the solenoid 38 is operated thereby rocking the shaft 35 to drop the shot caught between the pivoted valve 35′ and its headed contact 35a.

The switch 114 is similar to the switches 83, 89 and 94, and has its other solenoid 115 on its opposite end connected through a wire 115a with the headed contact 35a, opposite the valve 35′. It will be seen that when a shot drops between the said valve and the contact 35a, the solenoid 115 will be operated to shift the switch 114 to its closed position. This action closes the circuit between a wire 114a leading from the transformer 26, and a wire 114b which has connection with the score register, as will be hereinafter explained. At the same time it completes another electrical circuit between a wire 113a leading from the transformer 26′, and a wire 113b which is diectly connected to a lamp 16′ at the home base. It is noted that the valve on the rock shaft 35 is the lowermost valve in the channel 21a, thus when a shot drops between this valve and its contact, the switch 114 is thrown, not only lighting the lamp at home base to show that a run has crossed the plate, but also registering a run, which is visible through one of the windows 17, depending upon which side is at bat.

When the brush 111 engages the contact 112 to complete the circuit through the wire 112a to the solenoid 113, said solenoid is operated to throw the switch 114 back to its open position so that it may again be operated when another shot drops between the valve 35′ and contact 35a. The next contact 116 to be engaged by the brush 111 has a lead wire 116a, which is connected to the solenoid 99′ opposite the solenoid 99 of the switch 100.

This contact not only controls the switch 100 to throw it to its open position, but also is connected to all of the switches which control the lamps 14′ designating which play has been made. If a "single" has been made on the previous play, the "single" light 14′ on the score panel would have been lit and would have remained so until the next play, when the rings of all the distributors are again rotated.

The next contact 117 in the path of the brush 111 is positioned so that said brush will contact the same directly after the brush 56 of the distributor 51 has engaged its first contact 81. As has hereinbefore been explained, if a shot were held between the pivoted valve 34′ and its contact 34a, the switch 83 would be in its closed position, designating that a man was on third base. When the brush 58 engaged the contact 81 the shaft 34 would be rocked to allow the shot held by its valve 34′ to drop through to the lowermost valve 35′ on the rock shaft 35. At the same time, the switch 83 would be thrown to its open position, since the wire 81a leading from the contact 81 has connection with the solenoid 82 to operate said solenoid. When the shot dropped through to the lowermost valve 35′, the switch 114 would be shifted to light the lamp 16′ at the home plate, thereby showing that the man at third base had crossed the plate. Shifting the switch will also register a run, as will be hereinafter explained.

Directly after the brush 58 has passed off of the contact 81, the brush 111 on the ring 105 of the master distributor will engage the contact 117, which is connected to the wire 112a by a branch wire 117a. With this arrangement, immediately after a run has been scored and registered, the switch 114 which controls the scoring will be thrown to its open position. This also releases the shot from the channel and clears the lowermost valve so that the next shot dropped therebetween will again operate the scoring mechanism.

The three following contacts 118, 119 and 120 are connected in series and also to the contact 117, whereby the engagement of the brush 111 with any one of these contacts will produce the same result, that is, operate the lower rock shaft 35 and throw the switch 114 to its open position. These contacts are positioned so as to be engaged by the brush 111 immediately after the rock shaft 34 has been swung to allow any shot which may be held by the valves thereof to drop through to the lowermost valves 35′, whereby the scoring device is operated.

Each and every distributor for controlling the different plays, namely:—double, triple, and home run, have not been shown in the drawings as their construction and operation is the same as the single distributor 51, the only difference being in the number of contact points on their respective panels. It is pointed out that the three contacts 118, 119 and 120 of the master distributor are provided to co-act with these three distributors (not shown). Each of the channels connected with the chutes 20, 21, 22 and 23 have valves therein for operating the distributors which are not shown.

While the brush 111 is passing over the contacts as has just been explained, the brush 109 on the rear of the bar 106 is riding upon the arcuate contact 110, which extends almost the entire distance of the travel of said brush. This contact is connected directly to the motor through a lead wire 121a. When the brush 56 on the ring 50 engages the contact 102 on the panel 57 of the "single" distributor, it shifts the switch 65 to close the circuit from the wire 64a through the wire, 65a, which is connected to the spring brush 107, which is in constant engagement with the inner ring 104 of the master distributor. Thus the current is transmitted through the contact 110 and through the wire 121a to the motor 62. By carrying the circuit around the resistance 64c, the motor is speeded up, and the speed of the last half of each revolution of the rings is increased. This eliminates the necessity of having to wait a considerable length of time for the board to clear in order to be ready for the next play.

After passing the contact 120 (Figures 15, 16 and 17) the brush 111 next engages a contact 122. The contact 122 has a wire 122a leading therefrom, and this wire leads to a play switch hook-up, including switches 124 and 126 (Figure 16). The next contact point 123 in the path of the brush 110 has a wire 123a connected thereto, and this wire also leads to said play switch hook-up.

The play switch hook-up, which is shown in Figure 16, is provided so that two separate plays can be made from a single pivoted valve on one of the rock shafts. The hook-up includes the two switches 124 and 126. The switch 124 is provided with a plunger 124' which is secured at its ends to the cores 128' and 131' of the solenoids 128 and 131 of said switch, whereby the plunger is slidable between the solenoids. The plunger 124' carries five spring brushes which have their ends extending from either side thereof. The first of these brushes is arranged to engage contacts 133b and 134b to close the electrical circuit therebetween. The second brush is adapted to engage contacts 135b and 136b; the third brush is arranged to engage an elongated contact 140b on one side and a pair of contacts 142b and 143b on the other side; the fourth brush is arranged to engage contacts 123b and 127b; and the fifth brush is arranged to engage contacts 122b and 124b. It is noted that when the plunger 124' is in the position shown in Figure 16 the second brush is engaging the contacts 135b and 136b, the third brush is in engagement with the contacts 140b and 142b, and the fifth brush is in engagement with the contacts 122b and 124b. When the first, third and fifth brushes close the circuit between their contacts, it is seen by observing the drawings that the first and fourth brushes are not in engagement with their respective contacts and the circuit is broken between these contacts.

The switch 126 has a plunger 126' which has its ends secured to the cores 130' and 132' of solenoids 130 and 132, whereby said plunger is slidably mounted between said solenoids. The plunger 126' is similar to the plunger 124' and also carries five brushes which have their ends extending outwardly on either side of the plunger. The first brush is positioned to engage contacts 128b and 129b; the second brush is arranged to engage contacts 131b and 132b; the third brush is arranged to engage an elongated contact 143b on one side and a pair of contacts 144b and 145b on the other side; the fourth brush is arranged to engage contacts 125b and 126b, and the fifth brush is arranged to engage contacts 137b and 138b. With the switch 126 in the position shown in Figure 16, the first brush is engaging the contacts 128b and 129b, the third brush is in engagement with the contacts 143b and 145b and the fourth brush is resting on the contacts 125b and 126b. The second and fifth brushes are at this time out of engagement with their respective contacts, thereby breaking the circuit between these contacts.

A wire 122a leads from the contact 122 to the contact 122b, which is engaged by the fifth brush on the plunger 124'. It is obvious that this brush completes the electrical circuit between this contact and the contact 124b. The latter has a wire 124a extending therefrom and terminating at the contact 125b, which is an engagement with the fourth brush on the plunger 126'. Said brush completes the circuit between the contact 125b and the contact 126b on the opposite side of said plunger. The contact 126b is directly connected to the solenoid 128 of the switch 124 by a wire 126a. It is seen that with the switches 124 and 126 in the position shown in Figure 16, the brush 111 on the bar 106 of the master distributor will close the circuit through the contact 122 and over the wires 122a, 124a, and 126a, to operate the solenoid 128, whereby the plunger 124' is shifted to the left, thus disengaging the second, third and fifth brushes from their respective contacts and at the same time engaging the first and fourth brushes with their respective contacts.

The contact 123 on the master distributor panel 57' has a wire 123a leading therefrom and has connection with the contact 123b which, when the plunger 124' has been shifted to the left, is engaged by the fourth brush on said plunger. Thus, the electrical circuit is completed through the brush to the contact 127b which has connection through a wire 127a with the contact 128b. The first brush on the plunger 126' completes the circuit from the contact 128b to the contact 129b, which is directly connected by a wire 129a to the solenoid 130 of the switch 126. This operates said solenoid to shift the plunger 126' causing the first and fourth brushes of said plunger to ride off their respective contacts, and at the same time engaging the second, third and fifth brushes with their respective contacts. It is obvious that as the electrical current is carried from the brush 111 to the contacts 122 and 123 on the distributor panel 57', said current will serve to first operate the switch 124, shifting the plunger 124' to the left (Figure 16) and then operate the switch 126 to shift the plunger 126' also to the left.

For shifting the switches back to the positions shown in the drawings, another wire 131a is connected to the contact 122, and has connection with the contact 131b. This contact is engaged by the second brush on the plunger 126', which completes the circuit to the contact 132b. A wire 132a leads from the contact 132b to the contact 133b, which is engaged by the first brush on the plunger 124'. Its complementary contact 134b has direct connection through a wire 134a with the solenoid 131 of the switch 124. When the switch has been shifted to the left, as hereinbefore been explained, and the disc 105 is making its second revolution to bring the brush 111 into engagement with the contact point 122 the second time, the current will pass over the wires 131a, 132a and 134a to operate the solenoid 131 of the switch 124 to shift the same to its first position, or the position shown in the drawings. The contact 123 is provided with a second wire 135a leading therefrom to the contact 135b, which is engaged by the second brush on the plunger 124'. The brush completes the circuit to the contact 136b which is connected by a wire 136a with the contact 137b. The circuit is closed from the contact 137b and the contact 138b by the fifth spring brush on the plunger 126'. The contact 138b has a wire 138a leading therefrom to the second solenoid 132 of the switch 126. It is obvious that the operation of the switch 126 is identical with that of the switch 124, and upon each revolution of the ring 105, both switches are shifted either to the right or to the left. The third brush of the plunger 124' is in engagement at all times with the elongated contact 140b. A wire 140a forms a direct connection between the contact 140b and one of the pivoted valves 35' which controls an "out" play. The two contacts 141b and 142b, which are adapted to be engaged by the third brush on the plunger 124' according to the position of the switch 124, have wires 141a and 142a, respectively, leading therefrom, and each of these wires is connected to a switch (not shown) which controls a certain play.

The third brush on the plunger 126' is in constant engagement with the elongated contact 143b, which is connected with another of the pivoted valves 35' controlling an "out" play. The two contacts 144b and 145b, similar to the contacts 141b and 142b, are provided with lead wires 144a and 145a, respectively, and each of these wires leads to a switch (not shown), which carries the current to a distributor controlling a play. For instance, should a shot be dropped in the pivoted valve 35' connected through its contact 35a to the wire 140a, with the switches in the position shown in Figure 16, the current would pass upwardly through the wire 140a, through the third brush on the plunger 124', and through the wire 142a to a switch which would register a "strike" against the batter, and the motor would be started and the rings revolved, as has hereinbefore been explained.

As the brush 111 engages the contacts 122 and 123, respectively, the plungers 124' and 126' would be shifted to the left. Should the next shot fired, after the play designating a called "strike" has been completed, enter the same chute, and thereby again be caught between the pivoted valve and its contact which has connection with the wire 140a, the current would pass upwardly through the wire 140a, through the third brush on the plunger 124', and through the wire 141a to another switch which carries the current to another distributor. With this arrangement, it would be impossible to get two strikes in succession. Any number of play switches, or the hook-up just described, may be used, as it has been found desirable to use this hook-up in connection with a ball, foul, or any play wherein no action is had, and there is no advancement of the men already on base. Although it would be impossible to make an "out" by getting three strikes, or a "walk" by getting four balls, it has been found that more plays and combination of plays can be obtained by using this particular hook-up.

As the brush 111 on the ring 105 passes the contact 123 it next engages a contact 150, which is directly connected through a wire 150a to the wire 102a, which operates the solenoid 66 of the motor switch 65. This contact 150 is only used when the board is being cleared as will be hereinafter described.

The next contact 151 to be engaged by the brush 111 is connected to the wire 45a which operates the solenoid 43 of the switch 40. This action shifts the switch 40 to its open position, thereby breaking the circuit from the transformers 26 and 26' to the brushes 49 and 52 of the distributor 51. Although I have shown the wire 45a leading only to the switch 40, the contact 151 controls all the play switches. In other words, should any of the switches which send the current to the distributors be in their closed position, the engagement of the brush 111 with the contact 151 would serve to shift them to their open position. As the brush 111 rides off the contact 151, the brush 109 carrying the electrical current to the motor rides off its contact 110 to stop said motor. The momentum of the rings carries the brush 111 into engagement with its last contact 152 and also positions the brush 56 on its elongated contact 63 so that said brush will carry the current through said contact to start the motor the next time the swich 40 is again shifted to its closed position. This contact 152 has a wire 152a which serves to automatically clear the board after three "outs" are made, as will be hereinafter explained.

An "out" is registered on the board when the shot hits the outer end of the target and enters either one of the two outer chutes 22 or 23. When a shot enters the outer chute 23, it will pass downwardly through the conductor 23' and into the channel 23a. We will suppose that the channel 23a controls the play known as "out at second". This means the man has gotten a hit but is put out at second base. As will be seen by observing Figure 5, this channel is provided with one pivoted valve 35' which is mounted on the lowermost rock shaft 35. As the shot drops between the valve and its contact 35a, the current, which is fed to the valve through the wire 25' from the transformer 26, is sent from the valve through the shot, then through the contact 35a which has a wire 151a leading to the solenoid 153 of a playing switch 154, which is an exact replica of the switch 40. As the switch shifts to the right (Figure 23) it completes the circuit between wires 155a leading from the transformer 26', and 156a connected to a spring brush 157 which rides on an inner commutator ring 158 of a distributor 159 (Figures 21 and 22). At the same time the circuit is closed between a wire 157a, leading from the transformer 26, and a wire 158a connected to a spring brush 160, which is in constant engagement with the outer ring 161 of the distributor 159. The distributor 159 is constructed exactly as the distributors 51 and 103 except for the number of contacts on its panel 159', and it is not considered necessary to go into details of the construction of the same except to say that the rings 160 and 159 are rotated by the shaft 55 through the medium of the cross bar 160'. After the shot has dropped between the pivoted valve 35' and the contact 35a to complete the electrical circuit from the transformer to the solenoid, thereby shifting the switch 154 and supplying the current to the brushes 160 and 150 of the distributor 159, a spring brush 162, similar to the brush 56, mounted on the rear of the arm 160' and having electrical connection with the ring 161, sends the current through an elongated contact 163, and then through a wire 163a to the solenoid 64 of the motor switch 65. Since the operation of this switch has already been explained, it would be repetition to again go into the details of said switch. When the switch 65 is thrown, the motor 62 is started and the lamp in the pitcher's box is extinguished. The inner ring 158 has electrical connection with a brush 164 similar to the brush 58 and also mounted on the bar 160'. This brush first engages a contact 165 and has connection through a wire 165a to the lamp 15' at the home base. Thus as the rings begin their rotation, the lamp in the pitcher's box is extinguished and the lamp at the home base is lighted to show that the ball has been pitched.

The brush 164 next engages an elongated contact 166 which carries the current through a wire 166a to another pair of outfield switches 71' and 75' which control four of the lights in the outfield. These switches 71' and 75' are wired in the same way as the switches 71 and 75, and it is not believed necessary to describe the latter. While the brush 164 is engaging the contacts 165 and 166, the brush 162 engages the first three contacts in its path. The first contact 167 has a lead wire 167a connected to the solenoid 38, which engages the tripping lug 36 of the rock shaft 34. Since the rock shaft 34 controls the pivoted valves 34' which operate the lamp 91 at third base to designate a player thereon, the rocking of said shaft will drop any shot held by these valves to the lowermost valves 35', which will designate a player scoring. This action will serve to advance the player one base when an "out" is made. The next contact 168 engaged by the brush 162 has connection through a wire 168a to the solenoid 38, which operates the lug 36 on the rock shaft 33. Thus if a player were on second base, he would be advanced to third when the shaft 33 is rocked to drop the shot from one of the pivoted valves 33' onto one of the switches 34'. The following contact 169 on the distributor 159 is hooked-up in a similar way, and has a lead wire 169a connected to the solenoid 38 which operates the tripping lug on the rock shaft 32, whereby a player on first would be advanced to second.

It is obvious that as the brush 162 passes over the contacts 167, 168 and 169 the rock shafts 34, 33 and 32 respectively, will be operated to allow players on third, second, or first, to advance one base. Since the particular "out" play shown is an "out at second", or in other words, the player has made a hit, but was put out at second base, it is therefore necessary that any player already on base be advanced two bases instead of the usual one. To provide for this double advancement, two more contacts 170 and 171 are positioned in the path of the brush 162, directly after it has passed the first three contacts 167, 168 and 169. The contact 170 has a tie-in wire 170a connecting said contact with the wire 167a, whereby the rock shaft 34 is again operated. Similarly the contact 171 has connection through a tie-in wire 171a with the wire 168a which operates the solenoid 38 to rock the shaft 33. During the time that the brush 162 is passing the contacts 170 and 171, the brush 164 engages a contact 172, which is directly connected through a wire 172a to the lamp 91 at first base. This indicates that the player is traveling around the bases. After passing off the contact 172, the brush 164 engages a longer contact 173 which is connected directly to the other two lamps 91a and 91b at second base by a wire 173a. At the same time that the two lamps 91a and 91b are lighted, the brush 162 passes over a contact 174 positioned directly after the contact 171. The current is sent through the contact 174 and through a wire 174a leading therefrom to a solenoid 9 of a switch 100'. The switch 100' is similar to the switch 100 and controls the lighting of the lamps 14', which designate the play "out" at second on the scoreboard.

The next three contacts 177, 179 and 181 on the panel 159' of the distributor 159 to be engaged by the brush 162 control the three "outs" made each inning. Three switches 180, 178, and 185 are provided with plungers 180', 178' and 185' respectively. The plunger 180' of the switch 180 has its ends secured to the cores 182' and 183' of solenoids 182 and 183 of said switch, whereby said plunger is slidable between the solenoids. The plunger 178' is similarly secured at its ends to cores 283' and 184' of solenoids 283 and 184 of the switch 178. The plunger 185' has its ends fastened to the cores 186' and 187' of solenoids 186 and 187 of the switch 185.

The plunger 180' carries four brushes which extend from either side thereof. The first brush is adapted to engage contacts 179b and 179c positioned on either side of the plunger. The second brush is arranged to engage contacts 180b and 180c, the third brush is arranged to engage contacts 181b and 181c, and the fourth brush is arranged to engage contacts 182b and 182c.

The plunger 178' is also provided with four spring brushes, the first of which is adapted to engage contacts 183b and 183c. The second brush is arranged to engage contacts 184b and 184c; the third brush is arranged to engage contacts 185b and 185c, and the fourth brush is arranged to engage an elongated contact 186c on one side thereof and a pair of contacts 186b on the other side. The plunger 185' also carries four spring brushes, the first being arranged to engage contacts 187b and 187c, the second being arranged to engage contacts 188b and 188c, the third being arranged to engage contacts 189b and 189c, and the fourth spring brush being arranged to engage an elongated contact 190c on one side thereof and a pair of contacts 190b on the other side. It is pointed out that the construction of the switches 178, 180 and 185 is the same as that of the other switches hereinbefore described and it is obvious that the spring brushes on the plungers will serve to close the electrical circuits between their respective contacts when they engage said contacts.

A wire 177a connects the contact 177 on the panel 159' with the contact 184b positioned in the path of the second spring brush on the plunger 178'. When said plunger is in the position shown in Figure 23, the circuit is broken between the contact 184b and its complementary contact 184c. The contact 179 has a lead wire 179a which has its other end connected to the contact 180b in the path of the second spring brush on the plunger 180'. When the plunger 180' is in the position shown in the drawing the electrical circuits between the contacts 180b and 180c is broken. The contact 181 on the panel has connection through a wire 181a with the contact 179b in the path of the first spring brush on the plunger 180'. With the plunger in the position shown in the drawings (Figure 23), said brush completes the circuit between the contacts 179b and 179c. The contact 179c has direct connection, through a wire 179d, with the solenoid 182 of the switch 180. Thus, it is seen that as the brush 162 engages the contact 181 the solenoid 182 of the switch 180 is operated to shift the plunger 180' to the left. This shifting action engages the second, third and fourth brushes of said plunger with their respective contacts. The third brush completes the circuit between a wire 182a leading from the transformer 26' and another wire 190a which is directly connected to the first "out" lamp 190 on the scoreboard.

At the same time the second spring brush of the plunger 180' engages its respective contacts 180b and 180c to complete the circuit between a wire 181a leading from the contact 181 on the panel 159' and a wire 180d which connects the contact 180c with the contact 183b, which is in engagement with the first brush on the plunger 178'. The contact 183c, also in engagement with the plunger 178' is directly connected to the solenoid 283 of the switch 178. Thus, it is seen that after the switch 180 has been shifted to the left the electrical circuit is completed between the contact 181 on the panel 159' and the solenoid 283 of the switch 178, so that upon the next revolution of the disks 158 and 161 on the out distributor 159 the solenoid 283 will be operated to shift the switch 178 to the left.

This shifting of the switch 178 causes the second, third and fourth brushes on the plunger 178' to engage their respective contacts. The third brush closes the circuit between the wire 182a connected to the contact 185b and a second wire 191a connected to the contact 185c and leading to the second "out" lamp 191 on the score panel 14. At the same time the second brush on said plunger engages contacts 184b and 184c to close the circuit between a wire 177a leading from the contact 177 to the contact 184b, and a second wire 184d which connects the contact 184c with the contact 187b in the path of the first brush on the plunger 185'.

When the switch 178 has been shifted to the left upon the next revolution of the ring 161, the spring brush 162 will engage the contact 177 and the current will pass through said contact over wires 177a and 184d and then through the first spring brush on the plunger 185' to the contact 187c which is directly connected through a wire 187d with the solenoid 186 of the switch 185. This operation of the solenoid will shift the switch 185 to the left and will cause the second, third and fourth brushes to engage their respective contacts. The third brush will engage the contacts 189b and 189c and will close the circuit between the wire 182a leading from the transformer 26' to the contact 189b, and another wire 192a leading from the contact 189c to the third out light on the score panel. By arranging the three switches 180, 178 and 185 in this manner, it is pointed out that the switch 178, or the "second out" controlling switch, cannot be operated until the "first out" switch 180 has been shifted to light the lamp 191 on the score panel. Similarly, the "third out" switch 185 cannot be shifted until after the "second out" switch 178 has been operated. Thus, it is impossible to register the second or third out before the first out is made.

The last two contacts 188' and 189' on the panel 159' to be engaged by the brush 162 are similar to the contacts 102 and 104, and they perform the same operations, namely:—the shifting of the motor switch 65 to send the current to the motor through the master disc 103, and the shifting of one of the out-field switches so that a different outfield light will be lighted on the next play. When the "third out" switch 185 has been shifted to the left through the operation of its solenoid 186, the "third out" is registered as has been explained, and since the side is retired it is necessary to entirely clear the board. At the same time that the switch 185 is shifted to its closed position, it closes the circuit between a wire 152a, which leads from the last contact 152 on the master distributor 103, and another wire 185a, which has connection with a solenoid 188 of a switch 189. Thus, as the brush 111 on the rear of the disc 105 of the master distributor passes over the contact 152, it sends the current through the wire 152a, then through the wire 185a, whereby the solenoid 188 is operated to shift the switch 189 to its closed position. The shifting of the switch 189 completes the circuit between a wire 188a leading from the transformer 26, and another wire 189a, which is directly connected to a brush 193 of another distributor 194, and which is known as the clearing distributor.

This distributor, as is clearly shown in Figures 23 and 24, is provided with one commutator ring 195 instead of two, as is the case in the other distributors. The ring is supported by a cross bar 195' which is mounted on the shaft 55. A spring brush 196 is secured to the rear of the bar and a plurality of contacts are positioned on the panel of said distributor in the path of this brush. When the current from the transformer 26 is sent through the wires 188a and 189a and then through the brush 193 to the ring 195, the brush 196 which is resting on an elongated contact 197 on the panel 194' of the distributor 194, sends said current through a wire 197a to the motor switch 65 to again start the motor which has been stopped due to the brush 111 riding off the contact 110 of the master distributor. As the ring 195 begins its rotation, it engages contacts 201, 202, 203, 204 and 205, respectively, which are connected through wires 201a, 202a, 203a, 204a and 205a to the solenoids 38, which operate rock shafts 31, 32, 33, 34 and 35, respectively. Thus, should any shots be held between any of the pivoted switches, the rock shafts beginning with the topmost shaft 31 would be operated in order, to allow the shots to drop through, thereby clearing the channels.

The next contact 206 in the path of the brush 196 is provided for the purpose of shifting the "out" switches 178, 180 and 185 back to the positions shown in Figure 23. A wire 206a leading from this contact point terminates at the long contact 190c, which is constantly in engagement with the fourth spring brush on the switch 185. When the switch is shifted to the left the circuit is completed from the contact 190c through the brush to the contact 190b and then through a wire 190d to the solenoid 187' of the switch 185. As the circuit is completed from the contact 206 on the panel 194' to the solenoid 185' the switch is thrown back to its first position, or that shown in Figure 23. This shifting of the switch 185 closes the circuit between the contacts 190c and the second contact 190b which is connected to the elongated contact 186c by a wire 186d. The current passes through the contact 186c and through the fourth spring brush on the plunger 178'. The brush closes the circuit between this contact and one of the contacts 186b. The contact 186b has connection with the solenoid 184 of the switch 178, whereby said solenoid is operated when the switch 185 is in its normal position. This again throws the switch 178 to its open position, or that shown in Figure 23, and allows the current to pass through the fourth brush on the plunger 178', through the contact 186c and over a wire 209a, which is connected to a contact 182c engaged by the fourth spring brush on the plunger 180', when said switch is shifted to the left. The circuit is closed between the contacts 182c and 182b by said spring brush. The contact 182b is directly connected to the solenoid 183 of the switch 180 by a wire 182d. With this arrangement it will be seen that the "third out" switch 185 is first shifted back to its normal position and it is impossible to operate the first or second "out" switches before the third switch has been shifted. Similarly, it is impossible to shift the "first out" switch 180 to its normal position without first shifting the switch 178.

The next contact 207 has a wire 207a leading to the switch 100', which controls the "single" lamp 14' on the score panel, to operate its solenoid 99 to throw said switch to its open position. Although in the drawings I have shown it connected to this particular switch, it also is connected to the switches which control all the lamps on the scoreboard, designating the different plays, to shift said switches to their open position.

For recording the score of each side and also registering the inning, I provide three drums 211, 212, and 213. Each drum is constructed in exactly the same way, and a description of one will suffice for all three. Each drum is positioned behind one of the openings 17 in the panel 14 so that a portion of said drum is visible therethrough. The drums are provided with numbers in sequence on the periphery of the same. The drum is pivotally mounted on a shaft 214, which is supported in brackets 215 secured to a shelf 215' within the casing 10. The drum has a plurality of pins 216 extending from one side thereof. A lever 217 (Figures 19 and 20) also pivoted on the shaft 214 carries a solenoid 218 at its upper end. The lever is so constructed that the core 218' of the solenoid is positioned to engage between the pins 216 when current is supplied to said solenoid. The lower end of the lever 217 is pivotally connected to one end of a link 219, the other end of which has a pivotal connection with the core 220' of another solenoid 220, which is supported by an upright arm 221. A third solenoid 222 has its core 222' pivoted to an upstanding stop bar 223, which has a lug 224 engaging the pins 216 when the core of the solenoid is in its normal position. The lower end of the bar 223 is pivoted to a lug 224 on the shelf 215'. A weight 225 is secured by a flexible connection 225' to one of the pins 216 toward the forward end of the drum. This weight serves to pull the drum rearwardly and hold the pins constantly in engagement with the lug 225 on the arm 223.

The score registers are operated, when the switch 114 is thrown to its closed position due to a shot falling between any of the pivoted switches 35' in the three channels, which control single, double, or triple plays. As the switch 114 shifts to its closed position, the circuit is closed between the transformer 26', through the wires 113a and 113b, to light the lamp 15' at the home base showing that a player has crossed the plate. At the same time the circuit is completed between a wire 114a leading from the transformer 26, and another wire 114b. This sends the current through a switch 226 and then to one of the score drums 211 or 212. From the switch 226 the current is sent to the solenoids 220 and 218. As the core 220' of the solenoid 220 is operated, the lower end of the lever 217 is pulled rearwardly swinging the upper end of said lever upwardly. At the same time that the core 220' is operated, the core 218' of the solenoid 218 is also operated to engage two of the pins 216 on the side of the drum. It is obvious that the movement of the lever will rotate the drum to bring the next number into view through the window 17 in front of the playing field. The movement of the lever 217 is such that with each operation of the solenoid 220, the following number will become visible on the scoreboard. It is noted that only one of the score registers can be operated at one time. The shifting of the current from one register to the other is controlled by the switch 226 co-acting with another switch 227 and wired up similarly to the play shift switches 124 and 126.

The inning register 213 has direct connection through a wire 213a with a contact 208 on the panel 194, which is engaged by the brush 196, after said brush has passed the contact 207 on said distributor. The inning register is provided with double numbers, that is, two ones, two twos, etc. This is to provide for the shifting of the register each time three "outs" are made. In other words, it is necessary to have a number for the first half of the inning and the same number for the last half of the inning, since the drum is operated each time three "outs" are made.

The last two contacts 209 and 210 on the panel 194 are wired to the switches 226 and 227 in exactly the same way as the contacts 122 and 123 are hooked-up to the switches 124 and 126. In other words, each time the switch 189 is thrown to its closed position at the end of three "outs" and the current is carried to the distributor 194, the switches are shifted to one side or the other, to send the current to one or the other of the score registers. The switch 227 is provided with an elongated contact 227b, which is connected by a wire 227a to the transformer 26'. Opposite the contact 227b and adapted to be engaged by a brush on the switch 227, which is in constant engagement with the contact 227b, are two contacts 228b and 229b. The contact 229b has a wire 229a leading therefrom, and has connection with the lights which relate to the first side at bat. Thus when the circuit is complete to this wire, the lamps designating the first half of the first inning, the lamp showing which side is at bat, and the lamp adjacent the score register of that side, will be lighted. The contact 228b has a similar wire 228a which is connected to similar lights which designate the opposite side at bat.

Should it be desired to clear the board before three "outs" are made, I provide a wire 230 which has connection with the wire 185a. The other end of the wire is supplied with current through a push button, or any other suitable means. It is obvious that when the circuit is closed through the wire 230, the solenoid 188 of the switch 189 will be operated to carry the current to the ring 195, of the clearing distributor 194. This will be the equivalent of three "outs" since three "outs" must be made before the current is supplied to the switch 189. For turning the drums 211, 212 and 213 back to their normal positions, namely:—so that a zero is visible through the windows 17, I provide another wire 231 which is also operated by a push button, or similar means, to send the current directly to the solenoids 222 to operate the core 222' of the same. This action will swing the arm 223 rearwardly disengaging the lug 224 from the pins 216, and allowing the weight 225 to pull the drum around to its normal position.

The game is played by two players who position themselves within rifle range of the playing board 12. The board has been cleared and the score drums 211 and 212 have been released and are in their normal positions registering zero. The inning drum 213 is also in its starting position registering one. The lamp 18' on the score panel 14, indicating the first half of the first inning, is lighted and one of the lamps 14' adjacent the designation "at bat", indicating which player is batting, is also lighted. The lamp 18' positioned by one of the windows 17 is also lighted to show which drum will register that particular side's score. None of the other lamps on the board are lighted except the lamp in the pitcher's box.

The shot is fired and it depends entirely on the accuracy of the marksman which chute the shot will enter after it has passed through the target 16. We will suppose the shot has entered the chute 21 which controls the "single" play. The shot passes downwardly through the conductor 21' and onto the topmost switch valve 31' in the channel 21a. As has been hereinbefore explained, the shot closes the circuit between the transformer 26 and the solenoid 39 of the switch 40, to shift said switch to its closed position, thereby closing the circuit between the transformers 26 and 26' to the brushes 49 and 52 which ride on the rings 50 and 53 of the "single" distributor 51. The current passes from the ring 50 to one of the solenoids of the motor switch 65 to shift said switch (Figure 17) and start the motor. The shifting of the motor switch also breaks the circuit to the pitcher's box lamp, thereby extinguishing the same.

When the motor starts the shaft 55 is revolved through the gears 59 and 60 (Figure 8A), thereby rotating the disks 50 and 53. The brush 58 engages the contacts 68 and 69 to flash the lamp 51' at home base, showing the ball has been pitched, and to light and extinguish the lamp 78' in the outfield, indicating the flight of the ball. During this time, the brush 56 engages contacts 81, 87, 92 and 97 to rock the shafts 34, 33, 32 and 31 respectively, thereby advancing any players who might have been on any of the bases. The rocking of the shaft 31 drops the shot from the valve 31' to the valve 32'. The shot then closes the circuit to the solenoid 94 of the switch 95 which shifts said switch to light the lamp 91 at first base. While this action is taking place, the brush 111 is engaging contacts 112, 116, 117 and 118. The contact 116 serves to carry the circuit to the play switch 100 to shift said switch to its open position if said switch had been operated on the previous play. The contacts 112, 117 and 118 are all connected and carry the current to the solenoid 38 which rocks the lowermost shaft 35'. These contacts are also connected to the solenoid 113 of the switch 114 to shift said switch to its open position. The shifting of the switch opens the circuit between the transformer 26 and the solenoids 218 and 220 which operate the score register. It is noted that the switch 114 is shifted to its closed position when a shot drops onto the pivoted valve 35' to close the circuit from the transformer 26 to the solenoid 115 of the switch 114.

As the disk 50 continues its rotation, the brush 56 engages contacts 98, 102 and 104 on the panel 57. The contact 98 has connection with the switch 100 which when shifted to its closed position, lights the lamp 14' adjacent the designation "single" on the score panel 14. The contact 102 has connection with the solenoid 66 of the motor switch 65 to shift said switch to its first position and send the electrical current to the motor 62 around the resistance 64c through the master ring 103, whereby the motor is speeded up to rotate the rings faster on the last half of their revolution. The contact 104 is directly connected to the solenoid 73 of the outfield switch 71 to shift said switch so that a different outfield lamp will be lighted the next time the current is passed through said switch.

While the brush 56 is engaging contacts 98, 102 and 104, the brush 111 engages contacts 119, 120, 122 and 123. The contacts 119 and 120 are connected to the wire 112a which operates the solenoid 38 to rock the shaft 35. The contacts 122 and 123 shift the play switches 124 and 126 (Figure 16), which control four play distributors and which are controlled by two of the switch valves. The brush 111 next engages the last three contacts 150, 151 and 152. The contact 150 has connection with the solenoid 66 of the motor switch to shift said switch when the clearing distributor 194 is in operation. The contact 151 is connected to the solenoid 43 of the switch 40 to shift the same to its open position. It is pointed out that the switch 40 was shifted to its closed position at the start of the play when the shot dropped onto the pivoted valve 31'. The last contact 152 is connected through the "third out" switch 185 (Figure 23) to the solenoid 188 of the switch 189. The switch 189 controls the clearing distributor 194 and it is noted this switch is operated only after three "outs" have been made. At the same time that the brush 111 is in engagement with its last two contacts, the brush 109 rides off its contact 110 (Figure 14) to break the circuit to the motor 62, thereby stopping said motor.

The board is now clear and ready for the next play. The lamps 91 and 14', at first base and on the score board, respectively, are held lighted until the next shot enters one of the channels to start the motor and again rotate the rings on the master distributor and the rings on the distributor controlled by the channel which the shot entered. It is obvious that by providing a different number of contacts on the distributor most any play could be worked out, that is, a player on the board can be advanced one, two or three bases by merely providing enough contacts which will operate the switches controlling the different lamps on the playing board.

The description which has been given recites more or less detail of a particular embodiment of the invention, which is set forth as new and useful, however, I desire it understood that the invention is not limited to such exact details of construction because it is manifest that changes and modifications may be made within the scope of the appended claims without departing from the spirit of the invention.

What I claim and desire to secure by Letters Patent, is:

1. In an elecrtical baseball game apparatus, an upright game board having electric lamps thereon for indicating plays of the game, a target on the board, an electrical circuit closing device having spaced contacts for receiving a projectile to close a circuit through said projectile, a conductor leading from the target for conducting a projectile shot at the target to the said device, and electrically operated elements connected to said lamps and to said circuit closing device for lighting certain lamps to indicate plays of the game.

2. In an electrical baseball game apparatus, an upright game board having electric lamps thereon for indicating plays of the game, a target on the board, an electrical circuit closing device having spaced contacts for receiving a projectile to close a circuit through said projectile, a conductor leading from the target for conducting a projectile shot at the target to the said device, electrically operated elements connected to said lamps and to said circuit closing device for lighting certain lamps to indicate plays of the game, a score panel on the board having play designations and lamps complementary to said designations, and electrical circuit connections between said panel lamps and the electrically operated elements.

3. In a baseball game apparatus, an upright game board, a target on the board, a plurality of conductors leading from different portions of the target, and individual electric circuit closing devices connected with each conductor, each device having spaced contacts arranged to be electrically connected by a projectile fired at the target.

4. In an electrical baseball game apparatus, an upright channel, a plurality of superposed electrical contacts in said channel, a plurality of superposed switch valves pivoted in said channel and spaced from said contacts, each valve being close enough to a contact to support a metal shot therebetween for closing an electric circuit, and means for individually swinging the valves to drop a shot from one valve to the next lower valve.

5. In an electrical baseball game apparatus, an upright channel, an electrical contact in said channel, a pivoted switch valve in said channel spaced from said contact but close enough thereto to catch a metal shot therebetween for closing an electrical circuit, means for swinging the valve to release the shot and open the circuit, a game board, a plurality of lamps mounted on said board for indicating plays of a baseball game, and an electrical switching means having a plurality of contacts electrically connected with said lamps, and electrical connections between said valve and said means.

6. In an electrical baseball game apparatus, an upright channel, a plurality of superposed electrical contacts in said channel, a plurality of superposed switch valves pivoted in said channel and spaced from said contacts, each valve being close enough to a contact to support a metal shot therebetween for closing an electric circuit, means for individually swinging the valves to drop a shot from one valve to the next lower valve, a game board, a plurality of electric lamps mounted on the board for indicating plays of the game, switching means having a plurality of contacts connected with said lamps, and electrical connections between the valves and the contacts of said switching means.

7. In an electrical baseball game apparatus, an upright channel, an electrical contact in said channel, a pivoted switch valve in said channel spaced from said contact but close enough thereto to catch a metal shot therebetween for closing an electrical circuit, means for swinging the valve to release the shot and open the circuit, a target, and means for conducting a projectile shot at said target to said valve.

8. In an electrical baseball game apparatus, an upright channel, an electrical contact in said channel, a pivoted switch valve in said channel spaced from said contact but close enough thereto to catch a metal shot therebetween for closing an electrical circuit, means for swinging the valve to release the shot and open the circuit, a game board, a plurality of lamps mounted on said board for indicating plays of a baseball game, an electrical switching means having a plurality of contacts electrically connected with said lamps, electrical connections between said valve and said means, a target, and means for conducting a projectile shot at said target to said valve.

9. In an electrical baseball game apparatus, an upright channel, a plurality of superposed electrical contacts in said channel, a plurality of superposed switch valves pivoted in said channel and spaced from said contacts, each valve being close enough to a contact to support a metal shot therebetween for closing an electric circuit, means for individually swinging the valves to drop a shot from one valve to the next lower valve, a game board, a plurality of electric lamps mounted on the board for indicating plays of the game, switching means having a plurality of contacts connected with said lamps, electrical connections between the valves and the contacts of said switching means, a target, and means for conducting a projectile shot at said target to said valves.

10. In an electrical baseball game apparatus, an upright game board having electric lamps thereon for indicating plays of the game, a target on the board, a score indicator on the board, an upright channel, spaced contacts in said channel, pivoted switch valves in said channel spaced from said contacts, each valve being close enough to a channel contact to catch a metal shot therebetween for closing an electric circuit, means for conducting a shot fired at the target and passing therethrough to the uppermost valve, means for swinging the valves to drop the shot from one to another, switching connections between the contacts of some of the valves and the lamps for closing circuits to said lamps, and electrically operated means for actuating the score indicator having electrical circuit connection with the contact of the lowermost valve.

11. In an electrical baseball game apparatus, an upright game board having electric lamps thereon for indicating plays of the game, a plurality of electric lamps for indicating "outs", a plurality of upright channels each having electrical contacts therein, switch valves pivoted in said channels and spaced from said contacts, each valve being close enough to a contact to catch a metal shot therebetween for closing an electric circuit, a target, means for conducting shots fired by a rifle from said target to said channels, switching means connected with one of the valves and electrically connected with the lamps on the board, and a distributor electrically connected with the "out" lamps and one of the valves, and also connected with the circuits of all lamps for breaking said circuits.

12. In an electrical baseball game apparatus, an upright game board having a baseball diamond shown thereon, a score panel above said diamond and having designations of the plays of the game shown thereon, an electric lamp adjacent each of said designations, a pair of targets positioned on said playing board on either side thereof and below the diamond, an electrical circuit closing device having spaced contacts for receiving a projectile to close a circuit through said projectile, a conductor leading from each target for conducting a projectile shot at the target to the said device, and electrically operated elements connected to said lamps and to said circuit closing device for lighting lamps adjacent certain designations to indicate a particular play.

13. In an electrical baseball game apparatus, an upright game board having a baseball diamond shown thereon, an electric lamp positioned at each base for indicating a runner thereon, a score panel above said diamond on said game board and having designations of the plays of the game shown thereon, an electric lamp adjacent each of said designations, windows in said panels, a pair of scoring drums, having numbers printed on the periphery of each drum, mounted within the casing behind the panel so that a portion of the periphery of each drum is visible through said windows, a pair of targets on either side of said board below said diamond, an electrical circuit closing device having spaced contacts for receiving a projectile to close a circuit through said projectile, a conductor leading from each target for conducting a projectile shot at the target to said device, electrically operated elements connected to said lamps and to said circuit closing device for lighting lamps adjacent certain designations and on certain bases to indicate a certain play, and electrically operated elements connected to said scoring drums and to said circuit closing device for revolving the drums to register a run scored.

14. In an electrical baseball game apparatus, an upright game board having a baseball diamond shown thereon, a plurality of lamps on the diamond for indicating plays of the game, a score panel above said diamond, a window in said panel, an inning drum having numbers in sequence printed on the periphery of the same mounted behind the panel so that a portion of said periphery is visible through the window, a target on the board below the diamond, an electrical circuit closing device having spaced contacts for receiving a projectile to close a circuit through said projectile, a conductor leading from each target for conducting a projectile shot at the target to said device, electrically operated elements connected to said lamps and to said circuit closing device, electrically operated means for rotating said inning drum having electrical circuit connection with the circuit closing device, and means for controlling said operating means, whereby the drum is rotated after three "outs" are made.

15. In an electrical baseball game apparatus, an upright game board, a target on the board, an upright channel, spaced contacts in the channel, pivoted switch valves in said channel and spaced from said contacts, each valve being close enough to a contact to support a metal shot therebetween for closing an electrical circuit, means for individually swinging the valves to drop a shot from one valve to the next lower valve, a plurality of electric lamps mounted on the game board for indicating plays of the game, a distributor having a plurality of contacts connected with said lamps, a circuit closing switch, including a plunger slidable between two solenoids, said plunger having brushes secured thereon for engaging contacts having electrical connections with the valves and the contacts of said distributor, a target, and means for conducting a projectile shot at the target to said valves.

16. In an electrical baseball game apparatus, an upright game board having electrical lamps thereon for indicating plays of the game, a target on the board, a score indicator on the board, an inning indicator on the board, an upright channel, spaced contacts in said channel, pivoted switch valves in said channel spaced from said contacts, each valve being close enough to a channel contact to catch a metal shot therebetween for closing an electrical circuit, a conductor leading from the target for conducting a metal shot fired at the target and passing therethrough to the uppermost valve, a distributor having a plurality of contacts connected with some of the lamps, means for swinging the valves to drop the shot from one to another, electrical connections between said means and the contacts of the distributor, switching connections between the contacts of some of the valves and certain lamps for closing the circuit to said lamps, electrically operated means for actuating the score indicator having electrical circuit connection with the lowermost valve, and electrically operated means for actuating the inning indicator after three "outs" have been made.

In testimony whereof I affix my signature.

OLLO O. LAMB.